(12) United States Patent
Matsubara et al.

(10) Patent No.: US 10,334,262 B2
(45) Date of Patent: Jun. 25, 2019

(54) MOVING-PICTURE DECODING PROCESSING APPARATUS, MOVING-PICTURE CODING PROCESSING APPARATUS, AND OPERATING METHOD OF THE SAME

(71) Applicant: Renesas Electronics Corporation, Kawasaki-shi, Kanagawa (JP)

(72) Inventors: Katsushige Matsubara, Kanagawa (JP); Seiji Mochizuki, Kanagawa (JP); Toshiyuki Kaya, Kanagawa (JP); Tetsuya Shibayama, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 868 days.

(21) Appl. No.: 14/518,110

(22) Filed: Oct. 20, 2014

(65) Prior Publication Data

US 2015/0117549 A1 Apr. 30, 2015

(30) Foreign Application Priority Data

Oct. 24, 2013 (JP) .................................. 2013-220959

(51) Int. Cl.
*H04N 19/44* (2014.01)
*H04N 19/436* (2014.01)

(52) U.S. Cl.
CPC ........... *H04N 19/436* (2014.11); *H04N 19/44* (2014.11)

(58) Field of Classification Search
CPC ............... H04N 7/173; H04N 21/2547; H04N 21/2743; H04N 21/4756; H04N 21/812;
(Continued)

(56) References Cited

U.S. PATENT DOCUMENTS 8,756,476 B2 * 6/2014 Cai .................... H03M 13/1102
714/755
8,811,761 B2    8/2014 Sasai et al.
(Continued)

FOREIGN PATENT DOCUMENTS

JP          8-70457 A     3/1996
JP     2004-120710 A     4/2004
(Continued)

OTHER PUBLICATIONS

Gary J. Sullivan, et al., "Video Compression—From Concepts to the H.264/AVC Standard", Processing of the IEEE, Jan. 2005, pp. 18-31, vol. 93, No. 1.
(Continued)

*Primary Examiner* — Dave Czekaj
*Assistant Examiner* — Kehinde Abimbola
(74) *Attorney, Agent, or Firm* — McDermott Will & Emery LLP

(57) ABSTRACT

The present invention is directed to reduce deterioration in parallel processing capability. In a moving-picture decoding processing apparatus, information of a first plurality of frames and a second plurality of frames is supplied from a decoding control unit to first and second decoding processing units. For decoding the information from an intermediate point to an end point of a second preceding frame by the second decoding unit in a third period, use of a result of the process of the first decoding processing unit in the third period is inhibited, and use of a result of the process of a first preceding frame by the first decoding processing unit in a second period is permitted by an end signal. By reach of the intermediate point of the decoding of the second preceding frame by the second decoding processing unit in the second period, information from the start point to the intermediate point of the first subsequent frame included in the plural (Continued)

frames is decoded by the first decoding unit in the third period.

20 Claims, 7 Drawing Sheets

(58) Field of Classification Search
CPC .. H04N 5/85; H04N 9/8205; H04N 21/44222; H04N 21/4788; H04N 9/8042; H04N 21/23424; H04N 21/234309; H04N 21/2543; H04N 21/43; H04N 5/265; H04N 19/61; H04N 5/23229; H04N 5/272; H04N 5/92; H04N 5/926; H02H 1/0015; H02H 1/04; H02H 3/00; H02H 3/006; H02H 3/04; H02H 3/335
See application file for complete search history.

(56) References Cited

U.S. PATENT DOCUMENTS

| | | | | |
|---|---|---|---|---|
| 9,185,406 | B2* | 11/2015 | Tanaka | H04N 19/50 |
| 2002/0071490 | A1* | 6/2002 | Tsuboi | H04N 9/8042 |
| | | | | 375/240.15 |
| 2011/0001740 | A1* | 1/2011 | Jo | G09G 3/3233 |
| | | | | 345/211 |
| 2012/0099657 | A1* | 4/2012 | Tanaka | H04N 19/436 |
| | | | | 375/240.23 |
| 2012/0106652 | A1 | 5/2012 | Huang et al. | |
| 2012/0275516 | A1* | 11/2012 | Tanaka | H04N 19/50 |
| | | | | 375/240.12 |
| 2012/0294376 | A1* | 11/2012 | Tanaka | H04N 19/50 |
| | | | | 375/240.25 |
| 2013/0215957 | A1 | 8/2013 | Bartczak | |
| 2013/0246885 | A1* | 9/2013 | Cai | H03M 13/1102 |
| | | | | 714/755 |

FOREIGN PATENT DOCUMENTS

| | | |
|---|---|---|
| JP | 2006-14113 A | 1/2006 |
| JP | 2013-168950 A | 8/2013 |
| WO | 2013/011640 A1 | 1/2013 |

OTHER PUBLICATIONS

Gary J. Sullivan, et al., "Overview of the High Efficiency Video Coding (HEVC) Standard", IEEE Transactions on Circuits and Systems for Video Technology, Dec. 2012, pp. 1649-1668, vol. 22, No. 12.

Communication dated Jul. 11, 2017 from the Japanese Patent Office in counterpart application No. 2013-220959.

* cited by examiner

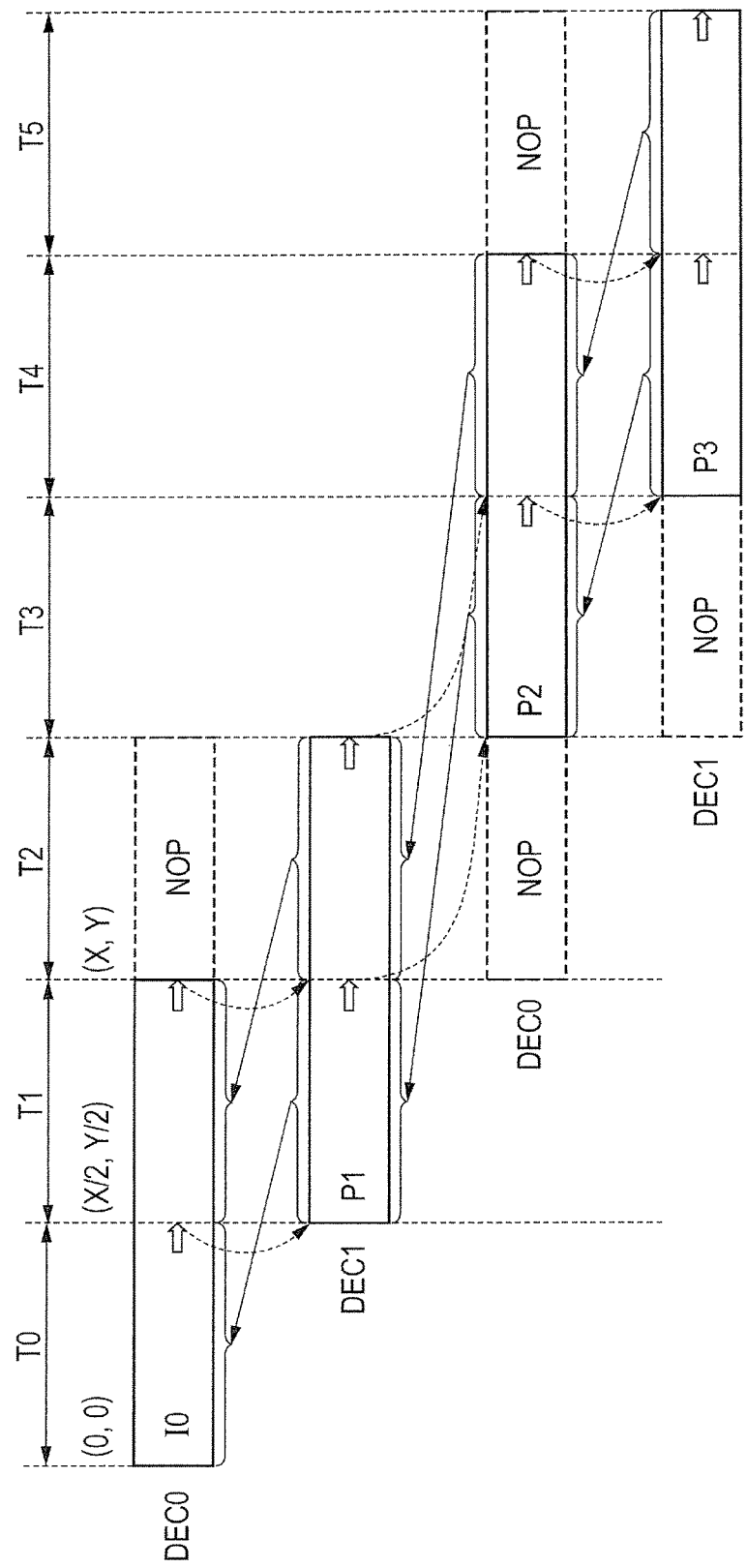

MOVING-PICTURE DECODING PROCESSING APPARATUS, MOVING-PICTURE CODING PROCESSING APPARATUS, AND OPERATING METHOD OF THE SAME

CROSS-REFERENCE TO RELATED APPLICATIONS

The disclosure of Japanese Patent Application No. 2013-220959 filed on Oct. 24, 2013 including the specification, drawings and abstract is incorporated herein by reference in its entirety.

BACKGROUND

The present invention relates to a moving-picture decoding processing apparatus, a moving-picture coding processing apparatus, and an operating method of the same and, more particularly, to a technique effective to lessen deterioration in processing capability in parallel processing.

As it is well known, a general compressing method of a moving picture according to the MPEG-2 standard standardized by the international standard ISO/IEC 13818-2 is based on the principle of reducing video storage capacity and necessary bandwidth by eliminating redundant information from a video stream. MPEG stands for Moving Picture Experts Group.

Since the MPEG-2 standard specifies only the syntax of a bit stream (the rules of a compression-coded data string or a method of configuring a bit stream) and decoding process, it is flexible so that it can be sufficiently used in various situations such as satellite broadcasting and service, cable television, interactive television, internet, and the like.

In an encoding process of MPEG-2, first, to specify the components of the color difference and luminance of each of pixels of a digital video, a video signal is sampled and quantized. The values of the components of the color difference and the luminance are accumulated in a macro block. The values of the color difference and luminance accumulated in the macro block are transformed to frequency values by using discrete cosine transform (DCT). A transform coefficient obtained by the DCT has a frequency which is different between luminance and the color difference of a picture. The transform factor of the DCT quantized is encoded by variable length coding (VLC) which further compresses a video stream.

In the encoding process of MPEG-2, addition compression according to the motion compressing technique is specified. In a standard of MPEG-2, three kinds of frames; I frame, P frame, and B frame (also called pictures) exist. The I frame refers to a frame which is intra-coded and means a frame to be reproduced without referring to any other frames in a video stream. The P frame and the B frame refer to frames which are inter-coded and mean frames to be reproduced with reference to the other frames. For example, each of the P frame and the B frame includes a motion vector indicative of motion estimation on a reference frame. By using the motion vector, an MPEG encoder can reduce a bandwidth necessary for a specific video stream. The I frame is called an intra-coded frame, the P frame is called a predictive-coded frame, and the B frame is called a bi-directionally predictive-coded frame.

Therefore, a moving-picture coding apparatus (encoder) of MPEG-2 includes a frame memory, a motion vector detecting unit, a motion compensating unit, a subtracting unit, a DCT unit, a quantizing unit, an inverse quantizing unit, an inverse DCT unit, a variable-length coding unit, and an adder. A moving picture signal coded is stored in the frame memory for coding of the P frame and the B frame and detection of a motion vector and read from the frame memory, and a motion compensation prediction signal from the motion compensating unit is subtracted by the subtracting unit. A prediction residual generated by the subtraction is subjected to a DCT process and a quantizing process in the DCT unit and the quantizing unit, respectively. The quantized DCT coefficient is subjected to a variable-length coding process by the variable-length coding unit, and subjected to a local decoding process in the inverse quantizing unit and the inverse DCT unit, and the result of the local decoding process is supplied directly to the adding unit and supplied to the subtracting unit via the motion compensating unit.

On the other hand, a moving-picture decoding apparatus (decoder) of MPEG-2 includes a buffer memory, a variable-length decoding unit, an inverse quantizing unit, an inverse DCT unit, a motion compensating unit, an adding unit, and a frame memory. A coded bit stream of MPEG-2 is stored in the buffer memory and, after that, subjected to a variable-length decoding process, an inverse quantizing process, and an inverse DCT process in the variable-length decoding unit, the inverse quantizing unit, and the inverse DCT unit, respectively. A prediction image obtained by the motion compensating unit from the motion vector subjected to the variable-length decoding process and the result of the inverse DCT process are added by the adding unit, and a reproduction image signal is generated from the output of the adding unit. The reproduction image signal is stored in the frame memory and used for prediction of other frames.

Subsequent to the MPEG-2 standard, a moving picture compressing method according to the MPEG-4 standard (H.263) standardized by the international standard ISO/IEC 14496 for coding at low rate for a television telephone or the like is also proposed. A compression method according to the MPEG-4 standard (H.263) is called a "hybrid type" using inter-frame prediction and discrete cosine transform like the MPEG-2 and, further, in which motion compensation in the ¼ pixel (quarter pel) unit is introduced. The compression method uses, like the MPEG-2, a Huffman code as entropy coding. By newly introducing a technique called three-dimensional variable length coding (three-dimensional VLC) which codes "run", "level", and "last" at the same time, the compression ratio is largely improved. The "run" and "level" relate to a run-length coefficient, and "last" indicates whether the coefficient is the last one or not. The MPEG-4 standard (H.263) further includes a basic part called baseline and an extended standard called annex.

To make the coding efficiency of the compression method according to the MPEG-4 standard (H.263) higher, the MPEG-4 AVC standard (H.264) is standardized by the international standard ISO/IEC 14496-10. AVC stands for advanced video coding, and the MPEG-4 AVC standard (H.264) is called the H.264/AVC standard.

Video coding according to the H.264/AVC standard includes a video coding layer and a network abstraction layer. Specifically, the video coding layer is designed to effectively express a vide context, and the network abstraction layer is to format the VCL expression of a video and give header information in a proper method for transfer by various transfer layers and storing media.

In international standard moving-picture coding methods such as MPEG-2, MPEG-4, H.264/AVC standard, and the like, to realize high coding efficiency, inter-frame predictive coding is used. A frame coding mode includes an I frame which is coded without using correlation of frames, a P frame predicted from one frame coded in the past, and a B frame which can be predicted from two frames coded in the past.

In the inter-frame predictive coding, a reference picture (predictive picture) which is motion-compensated is subtracted from a moving picture, and a prediction residual by the subtraction is coded. The coding process includes processes of orthogonal transform such as DCT (Discrete Cosine Transform), quantization, and variable-length coding. The motion compensation (motion correction) includes a process of spatially moving a reference frame of inter-frame prediction. The motion compensation process is performed on a block unit basis of frames to be coded. In the case where there is no motion in an image, there is no transfer and the pixel in the same position as that of a pixel to be predicted is used. In the case where there is a motion, a block which is most adapted is retrieved and a movement amount is used as a motion vector. A motion compensation block is a block of 16 pixels×16 pixels/16 pixels×8 pixels in the MPEG-2 coding method and is a block of 16 pixels×16 pixels/16 pixels×8 pixels/8 pixels×8 pixels in the MPEG-4 coding method. The motion compensation blocks are blocks of 16 pixels×16 pixels/16 pixels×8 pixels/8 pixels×16 pixels/8 pixels×8 pixels/8 pixels×4 pieces/4 pieces×8 pieces/4 pixels×4 pixels in the coding method of the H.264/AVC standard.

The above-described coding process is performed every video image screen (frame or field), and a block (usually, 16 pixels×16 pixels, called the macro block (MB) in the MPEG) obtained by segmentalizing a screen is a process unit. That is, a most similar block (prediction picture) is selected from reference pictures already coded every block to be coded, and a difference signal between a picture (block) to be coded and a prediction picture is coded (orthogonal transform, quantization, and the like). The difference in relative positions between a block to be coded and a prediction signal in the screen is called a motion vector.

In the following non-patent literature 1, it is described that a video coding layer (VCL) according to the H.264/AVC standard follows an approach called block-based hybrid video coding. VCL design includes a macro block, a slice, and a slice block. Each picture is divided into a plurality of macro blocks of fixed size. Each macro block includes a rectangular picture region of 16×16 samples in luminance components, and rectangular sample regions in two color difference components corresponding to the luminance component. One picture can include one or more slices, and each slice is self-inclusive in a sense that it gives an active sequence and a picture parameter set. Since the slice representation can be basically decoded without using information from other slices, a syntax element can be analyzed from a bit stream and the value of a sample in a picture area. For more complete decoding, however, to make a deblocking filter adapted to the slice border, some information from other slices is necessary. The non-patent literature 1 also describes that since each slice is encoded/decoded independently of other slices of a picture, the slices can be used for parallel processing.

On the other hand, the picture size of a system handling moving picture codes such as a digital HDTV (High Definition Television broadcast receiver or a digital video camera capable of capturing an HDTV signal is becoming larger. A picture coding apparatus and a picture decoding apparatus processing those signals are requested to have higher processing capability.

From such a background, the H.265 (ISO/IEC 23008-2) standard as a standard following the H.264/AVC standard was proposed. The new standard is also called the HEVC (High Efficiency Video Coding) standard. The HEVC standard has excellent compression efficiency realized by making the block size proper and has compression efficiency which is about four times as high as that of the MPEG-2 standard and is about twice as high as that of the H.264/AVC standard.

On the other hand, the patent literature 1 describes that one macro block made of 16×16 pixels is used as a process unit of motion compensation and subsequent processes in widely-adopted various coding compression standards such as MPEG-1, MPEG-2, MPEG-4, H.261, H.263, H.264, AVC standard, and the like whereas, in the H.265/HEVC standard, a more flexible block structure is employed as a process unit. The unit of the flexible block structure is called a coding unit (CU). Starting from the largest coding unit (LCU), to achieve excellent performance, a picture is adaptively divided into small blocks using quadtree. The size of the largest coding unit (LCU) is 64×64 pixels much larger than the size of the macro block of 16×16 pixels. In FIG. 1 of the patent literature 1 and disclosure related to it, an example of coding unit division based on the quadtree is shown. In the depth "zero", the initial coding unit (CU) is a largest coding unit (LCU) made of 64×64 pixels. The split flag "0" indicates that the coding unit (CU) at that time point is not split, and the split flag "1" indicates that the coding unit (CU) at that time point is split to four small coding units by the quadtree. The patent literature 1 also describes that the coding unit (CU) after splitting is further split by the quadtree until it reaches a preliminarily specified minimum coding unit (CU) size.

The non-patent literature 2 describes the overview of the H.265/HEVC standard. The core of a coding layer in the previous standards is a macro block including a 16×16 block of luminance samples and two 8×8 blocks of chroma samples, whereas the core in the H.265/HEVC standard is a coding tree unit (CTU) which is larger than a traditional macro block and has a size selected by an encoder. The coding tree unit (CTU) includes a luminance coding three block (CTB), chroma coding three blocks, and syntax elements. The quadtree syntax of the coding tree unit (CTU) specifies the size and positions of its luminance and chroma coding tree blocks (CTB). The decision whether to use an inter-picture or intra-picture is made at the level of the coding unit (CU). The splitting structure of a prediction unit (PU) has its root at the level of the coding unit (CU). Depending on the basic prediction-type decision, the coding block (CB) of luminance and chroma can be split in size and predicted from prediction blocks (PB) of luminance and chroma. The H.265/HEVC standard supports variable sizes of the prediction blocks (PB) from 64×64 samples to 4×4 samples. The prediction residual is coded using block transforms. The tree structure of a transform unit (TU) has its root at the level of the coding unit (CU). The residual of the coding block (CB) of luminance can be identical to the transform block (TB) of luminance or can be further split into smaller luminance transform blocks (TB). The same applies to the transform blocks (TB) of chroma. Integer basis functions similar to those of a discrete cosine transform (DCT) are defined for the sizes of square transform blocks (TB) of 4×4, 8×8, 16×16, 32×32 samples. In the H.265/HEVC standard, like in the H.264/AVC standard, uniform reconstruction quantization (URQ) is used. That is, the range of the values of the quantization parameter (QP) is defined from 0 to 51, and the mapping of the quantization parameter (QP) approximately corresponds to logarithms of a quantization scaling matrix.

Further, the non-patent literature 2 also describes that a slice of the H.265/HEVC standard is a data structure that can be coded independently from other slices of the same picture. The non-patent literature 2 also describes that novel features of tiles and wavefront parallel processing (WPP) are introduced in the H.265/HEVC standard in order to modify the structure of slice data for enhancing the processing capability in the parallel process or for packetization purposes. Tiles are used to partition a picture into rectangular regions and main purpose of the tiles is to increase the capability for parallel processing rather than provide error resilience. A plurality of tiles is regions which can be decoded independently of a single picture and coded with shared header information. A slice is divided into rows of a plurality of coding tree units (CTU) by the wavefront parallel processing (WPP). The first row is processed in an ordinary way, the second row can begin to be processed after some decision is made in the first row, and the third row can begin to be processed after some decision is made in the second row.

Further, FIGS. 7, 8, and 9 of the patent literature 2 and the disclosure related to the literature illustrate an MPEG decoder performing parallel processing at the slice level on a bit stream coded by the MPEG-2 standard. Specifically, in the MPEG-2 standard, a slice includes only macro blocks (MB) of one row. By performing the parallel processing at the slice level, the MPEG decoder executes the parallel processing of the macro blocks (MB) of a plurality of rows.

The patent literature 2 also describes a problem that, since a unique code called a slice header as in the MPEG-2 standard does not exist in a picture called VOP (Video Object Plane) in the MPEG-4 (H.263) standard, the parallel processing at the slice level cannot be performed. To solve the problem, the image decoding apparatus according to the first embodiment of FIGS. 1 and 2 of the patent literature 2 has a bit stream analyzer, four VOP decoders, a frame memory, and a memory control unit. The bit stream analyzer executes decoding process start control on the four VOP decoders so that the decoding process start timing of each of macro blocks in the four VOP decoders becomes after completion of the decoding of a reference picture region needed by each of the macro blocks. In the first embodiment of FIGS. 1 and 2 of the patent literature 2, to concretely execute the decoding process start, an FCODE is used. In the case where FCODE=2, a reference picture region becomes ±32 pixels, so that the reference picture region needed by a process macro block in the picture to be coded lies in a range of two upper and lower macro blocks (MB) and two right and left macro blocks (B) with respect to the position of the process macro block. With respect to the FCODE, as illustrated in FIG. 13 of the patent literature 3, in the case where FCODE=1, a motion vector search range becomes −16 to +15.5 pixels. In the case where FCODE=2, the motion vector search range becomes −32 to +31.5 pixels. In the case where FCODE=3, the motion vector search range becomes −64 to +63.5 pixels. In the case where FCODE=4, the motion vector search range becomes −128 to +127.5 pixels. In the case where FCODE=5, the motion vector search range becomes −256 to +255.5 pixels. In the case where FCODE=6, the motion vector search range becomes −512 to +511.5 pixels. In the case where FCODE=7, the motion vector search range becomes −1024 to +1023.5 pixels.

Further, in the second embodiment of FIGS. 3 and 4 of the patent literature 2, it is described that in the case where a motion vector indicating the reference picture region needed by the process macro block in the picture to be coded indicates an unprocessed region, a decode control unit controls the apparatus to wait until decoding of the unprocessed region is completed.

PRIOR ART LITERATURE

Patent Literature

Patent Literature 1: U.S. patent No. US2012/0106652A1 Specification
Patent Literature 2: Japanese Unexamined Patent Application Publication No. 2006-14113
Patent Literature 3: Japanese Unexamined Patent Application Publication No. 2004-120710

Non-Patent Literature

Non-Patent Literature 1: Gary J. Sullivan et al, "Video Compression—From Concept to the H.264/AVC standard", Processing of the IEEE, Vol. 93, No. 1, January 2005, pp. 18-31
Non-Patent Literature 2: Gary J. Sullivan et al, "Overview of the High Efficiency Video Coding (HEVC) Standard", IEEE Transactions on Circuits and Systems for Video Technology, Vol. 22, No. 12, December 2012, pp. 1649-1668

SUMMARY

Prior to the present invention, the inventors of the present invention engaged in development of a picture decoding apparatus (video decoder) capable of decoding a bit stream which is coded in accordance with the H.265/HEVC standard and H.264/ACV standard.

In the development, prior to the present invention, first, the inventors of the present invention reviewed the video decoder according to the first embodiment of FIGS. 1 and 2 of the patent literature 2.

That is, in the first embodiment of FIGS. 1 and 2 of the patent literature 2, to concretely execute a decoding process start control, an FCODE indicative of a motion vector search range is used. Although the FCODE is used in three standards of MPEG-1/2/4 (H.263), it is not used in the H.265/HEVC standard and the H.264/AVC standard which were recently announced.

Therefore, by examination of the inventors of the present invention prior to the present invention, it was clarified that a video decoder capable of decoding a bit stream encoded according to the H.265/HEVC and the H.264/ACV standard cannot execute a decoding process control of a parallel process by using the FCODE described in the first embodiment of the patent literature 2.

On the other hand, the H.265/HEVC standard has excellent compression efficiency realized by making the block size proper and has compression efficiency which is about four times as high as that of the MPEG-2 standard and is about twice as high as that of the H.264/AVC standard. As the picture size of a digital HDTV (High Definition Television) broadcast receiver, a digital video camera capable of capturing an HDTV signal, or the like is becoming larger, a moving-picture coding apparatus and a moving-picture decoding apparatus are requested to have higher processing capability. The HEVC standard is expected to satisfy those requests.

On the other hand, in recent years, a 4K TV including a display device having a size of 4,096 pixels×2,160 pixels which is about four times as large as 1,920 pixels×1,080 pixels as the pixel size of high definition (HD), or 3,840 pixels×2,160 pixels draws attention. For example, in Japan, the Ministry of Internal Affairs and Communications announced a policy that 4K TV broadcasting starts from July, 2014. A moving-picture coding apparatus and a moving-picture decoding apparatus executing coding/decoding of a moving-picture signal of one frame (picture) corresponding to the display screen of a display device of a 4K TV are also requested to have higher processing capability.

On the other hand, by the examination of the inventors of the present invention, it was clarified that, in a moving-picture coding apparatus which executes a coding process in conformity to the H.265/HEVC standard and H.264/AVC standard, the maximum value of the size of a motion vector by a moving-picture coding process is often about the half of the pixel size (1,920 pixels×1,080 pixels) of high definition (HD).

FIG. 7 is a diagram explaining the operation of a moving-picture decoding apparatus examined by the inventors of the present invention prior to the present invention in consideration of the fact that the maximum value of the size of a motion vector is about the half of a pixel size of high definition (HD).

A coded bit stream generated from a not-illustrated moving-picture coding apparatus is supplied to a not-illustrated decoding control unit, and coded information of each of a first I frame I0, a second P frame P1, a third P frame P2, and a fourth P frame P3 is generated from the decoding control unit.

To reduce hardware of the moving-picture decoding apparatus executing parallel decoding processing, the coded information of the first I frame I0 and the third P frame P2 as odd-numbered frames is decoded by a first decoding processing unit DEC0, and the coded information of the second P frame P1 and the fourth P frame P3 as even-numbered frames is decoded by a second decoding processing unit DEC1.

The first I frame I0 includes coded information of each of a start point (0, 0), an intermediate point (X/2, Y/2), and an end point (X, Y) of a raster scan of a moving-picture coding screen which is set in the pixel size of high definition (HD). Specifically, the moving-picture coded screen set in the pixel size of high definition (HD) has X pieces of pixels in the horizontal direction and Y pieces of pixels in the vertical direction. Each of the second P frame P1 as an even-numbered frame, the third P frame P2 as an odd-numbered frame, and the fourth P frame P3 as an even-numbered frame has the coded information of each of the start point (0, 0), the intermediate point (X/2, Y/2), and the end point (X, Y) of the raster scan of the moving-picture coded screen set in the pixel size of high definition (HD).

Since the second decoding processing unit DEC1 monitors the decoding process position in the first I frame I0 by the first decoding processing unit DEC0, in response to the end of the decoding process of the first-half part of the first I frame I0 by the first decoding processing unit DEC0, the decoding process of the first-half part of the second P frame P1 by the second decoding processing unit DEC1 starts. Further, in response to the end of the decoding process of the latter-half part of the first I frame I0 by the first decoding processing unit DEC0, the decoding process of the latter-half part, of the second P frame P1 by the second decoding processing unit DEC1 starts. That is, in a first period T0 since the first decoding processing unit DEC0 starts the process of decoding the coded information at the start point (0, 0) of the first I frame I0 until it starts the process of decoding the coded information at the intermediate point (X/2, Y/2) of the first I frame I0, a single decoding process that only the first decoding processing unit DEC0 executes the decoding process and the second decoding processing unit DEC1 stops the decoding process is executed. Further, in a second period T1 since the first decoding processing unit DEC0 starts the process of decoding the coded information at the intermediate point (X/2, Y/2) of the first I frame I0 until it finishes the process of decoding the coded information at the endpoint (X, Y) of the first I frame I0, a parallel decoding process that the first and second decoding processing units DEC0 and DEC1 execute the decoding process is executed. That is, when it is detected that the process of decoding the first I frame I0 by the first decoding processing unit DEC0 starts from the start point (0, 0) and reaches the intermediate point (X/2, Y/2), in response to the detection result, the process of decoding the first half of the second P frame P1 by the second decoding processing unit DEC1 starts from the start point (0, 0). After that, when it is detected that the process of decoding the first I frame I0 by the first decoding processing unit DEC0 reaches the end point (X, Y), in response to the detection result, the process of decoding the latter half of the second P frame P1 by the second decoding processing unit DEC1 starts from the intermediate point (X/2, Y/2) in a third period T2.

Therefore, the process of decoding the first I frame I0 by the first decoding processing unit DEC0 and the process of decoding the second P frame P1 by the second decoding processing unit DEC1 are pipeline operation having a time difference of about the half of the pixel size of high definition (HD). As a result, by the pipeline operation having the time difference of about the half of the pixel size of high definition (HD), a result of the intra decoding process in the first-half part of the first I frame I0 by the first decoding processing unit DEC0 in the first period T0 can be used as reference picture information for an inter-decoding process of the first-half part of the second P frame P1 by the second decoding processing unit DEC1 in the second period T1. Further, a result of the intra decoding process in the latter-half part of the first I frame I0 by the first decoding processing unit DEC0 in the second period T1 can be used as reference picture information for an inter-decoding process of the latter-half part of the second P frame P1 by the second decoding processing unit DEC1 in the third period T2.

However, by the examination of the inventors of the present invention, the problem was clarified that since the first decoding processing unit DEC0 has to execute a no-operation (NOP) instruction in the third period T2 by the operation of the motion-picture decoding apparatus illustrated in FIG. 7, the capability of the parallel decoding process is reduced.

The first decoding processing unit DEC0 has to execute the no-operation (NOP) instruction in the third period T2 for the following reason.

As described above, the second decoding processing unit DEC1 monitors the decoding process positions in the first I frame I0 and the third P frame P2 by the first decoding processing unit DEC0. Consequently, also in the third period T2 in which the second decoding processing unit DEC1 executes the inter-decoding process of the latter-half part of the second P frame P1, the second decoding processing unit DEC1 monitors the decoding process position of the first decoding processing unit DEC0. It is therefore assumed that the first decoding processing unit DEC0 executes the inter-decoding process on the first-half part of the third frame P2 in the third period T2. In this case, a problem occurs such that reference picture information to be referred to by the second decoding processing unit DEC1 for the inter-decoding process in the latter-half part of the second P frame P1 in the third period T2 is undesirably overwritten by the inter-decoding process in the first-half part of the third P frame P2 by the first decoding processing unit DEC0. Reference picture information to be referred to by the second decoding processing unit DEC1 in the third period T2 for the inter-decoding process in the latter-half part of the second P frame P1 is a result of the decoding process in the latter-half part of the first I frame I0 by the first decoding processing unit DEC0 in the second period T1. Therefore, to solve the problem of the overwriting of the reference picture information, the first decoding processing unit DEC0 has to execute the no-operation (NOP) instruction in the third period T2. Consequently, a problem such that the capability of the parallel decoding process deteriorates occurs.

Means and the like for solving such a problem will be described later. The other subjects and novel features will become apparent from the description of the specification and the appended drawings.

Outline of a representative embodiment disclosed in the present application will be briefly described as follows.

A moving-picture decoding processing apparatus as a representative embodiment has a decoding control unit (10), a first decoding processing unit (20), and a second decoding processing unit (21).

The decoding control unit (10) generates coded information of a first plurality of frames (I0, P2) and coded information of a second plurality of frames (P1, P3) from a coded bit stream (BS).

The coded information of the first plurality of frames (I0, P2) is supplied from the decoding control unit (10) to the first decoding processing unit (20), and the coded information of the second plurality of frames (P1, P3) is supplied from the decoding control unit (10) to the second decoding processing unit (21).

For a process of decoding the coded information from the intermediate point (X/2, Y/2) to the end point (X, Y) of the second preceding frame (P1) by the second decoding processing unit (21) in the third period (T2), in response to a first end signal (PEN0), use of a result of the decoding process by the first decoding processing unit (20) in the third period (T2) is inhibited.

For a process of decoding the coded information of the second preceding frame (P1) by the second decoding processing unit (21) in the third period (T2), use of a result of the decoding process of the first preceding frame (I0) by the first decoding processing unit (20) in the second period (T1) is permitted.

In response to reach of the intermediate point (X/2, Y/2) of the process of decoding the second preceding frame (P1) by the second decoding processing unit (21) in the second period (T1), coded information from the start point (0, 0) to an intermediate point (X/2, Y/2) of a first subsequent frame (P2) included in the first plurality of frames (I0, P2) is subjected to a decoding process by the first decoding processing unit (20) in the third period (T2) (refer to FIGS. 1 and 2).

An effect obtained by the representative one of embodiments disclosed in the present application will be briefly described as follows.

That is, in the moving-picture decoding processing apparatus, deterioration of the parallel processing capability can be reduced.

BRIEF DESCRIPTION OF THE DRAWINGS

FIG. 7 is a diagram explaining the operation of a moving-picture decoding apparatus examined by the inventors of the present invention prior to the present invention, in consideration of the fact that the maximum value of the size of a motion vector is about the half of a pixel size of high definition (HD).

DETAILED DESCRIPTION

1. Outline of Embodiments

Figure 1:
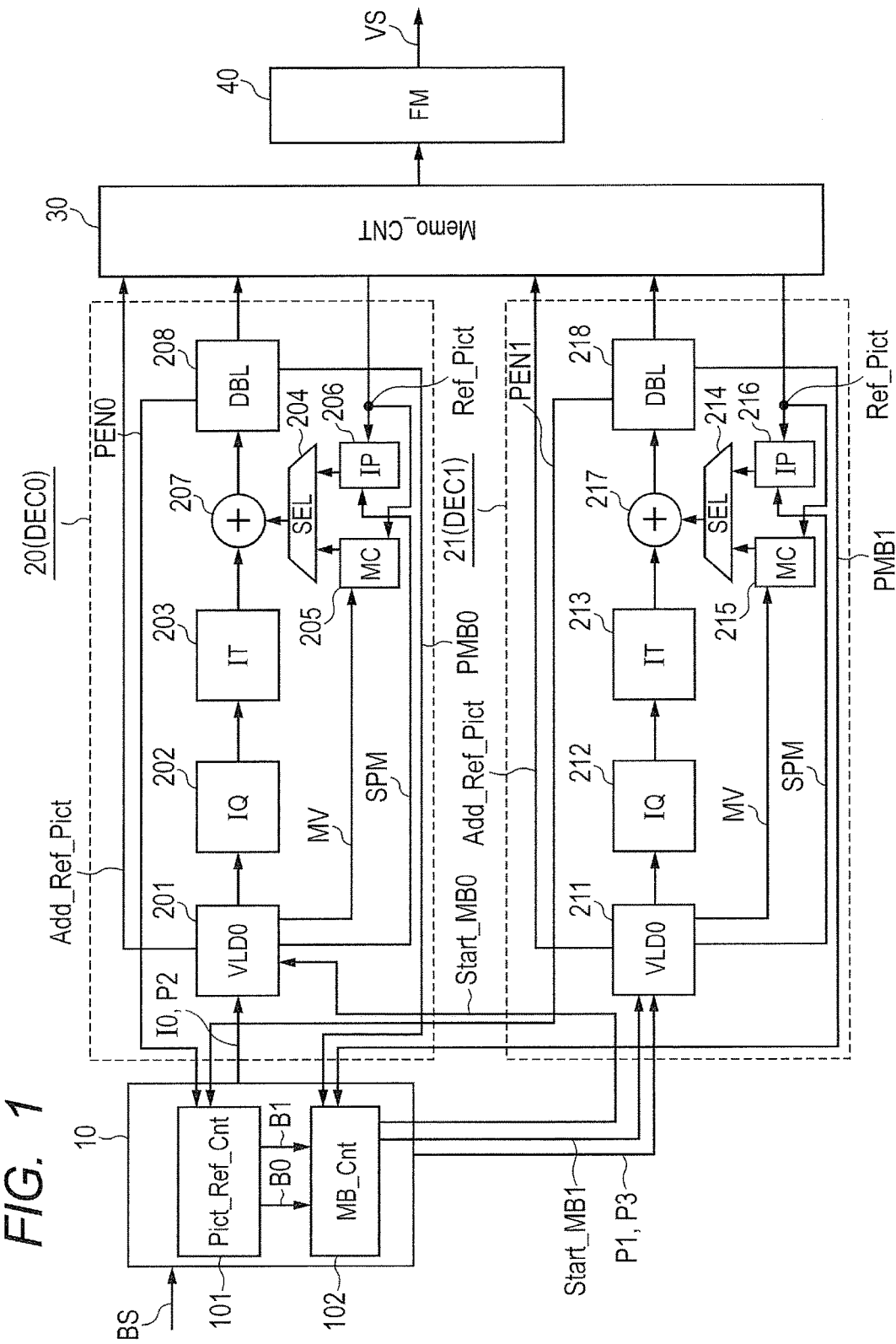
FIG. 1 is a diagram illustrating the configuration of a moving-picture decoding processing apparatus according to a first embodiment.

First, the outline of representative embodiments disclosed in the application will be described. A reference numeral in a drawing referred to in parenthesis in the description of the outline of the representative embodiments merely illustrates a matter included in the concept of the component to which the reference numeral is designated.

[1] A moving-picture decoding processing apparatus as a representative embodiment has a decoding control unit (10), a first decoding processing unit (20), and a second decoding processing unit (21).

The decoding control unit (10) generates coded information of a first plurality of frames (I0, P2) and coded information of a second plurality of frames (P1, P3) from a coded bit stream (BS).

The coded information of the first plurality of frames (I0, P2) is supplied from the decoding control unit (10) to the first decoding processing unit (20), and the coded information of the second plurality of frames (P1, P3) is supplied from the decoding control unit (10) to the second decoding processing unit (21).

In a first period (T0), the coded information from a start point (0, 0) of a first preceding frame (I0) included in the first plurality of frames (I0, P2) to an intermediate point (X/2, Y/2) is subjected to a decoding process by the first coding processing unit (20).

In response to reach of the intermediate point (X/2, Y/2) of the decoding process of the first preceding frame (I0) by the first coding processing unit (20) in the first period (T0), in a second period (T1), the coded information from a start point (0, 0) of a second preceding frame (P1) included in the second plurality of frames (P1, P3) to an intermediate point (X/2, Y/2) is subjected to a decoding process by the second decoding processing unit (21).

In the second period (T1), the coded information from the intermediate point (X/2, Y/2) to the end point (X, Y) of the first preceding frame (I0) included in the first plurality of frames (I0, P2) is subjected to a decoding process by the first decoding processing unit (20).

In response to a first end signal (PEN0) indicative of reach of the end point (X, Y) of the decoding process of the first preceding frame (I0) by the first decoding processing unit

(20) in the second period (T1), in a third period (T2), the coded information from the intermediate point (X/2, Y/2) to the end point (X, Y) of the second preceding frame (P1) is subjected to a decoding process by the second decoding processing unit (21).

For a process of decoding the coded information from the intermediate point (X/2, Y/2) to the endpoint (X, Y) of the second preceding frame (P1) by the second decoding processing unit (21) in the third period (T2), in response to the first end signal (PEN0), use of a result of the decoding process by the first decoding processing unit (20) in the third period (T2) is inhibited.

For a process of decoding the coded information of the second preceding frame (P1) by the second decoding processing unit (21) in the third period (T2), use of a result of the decoding process of the first preceding frame (I0) by the first decoding processing unit (20) in the second period (T1) is permitted.

Figure 2:
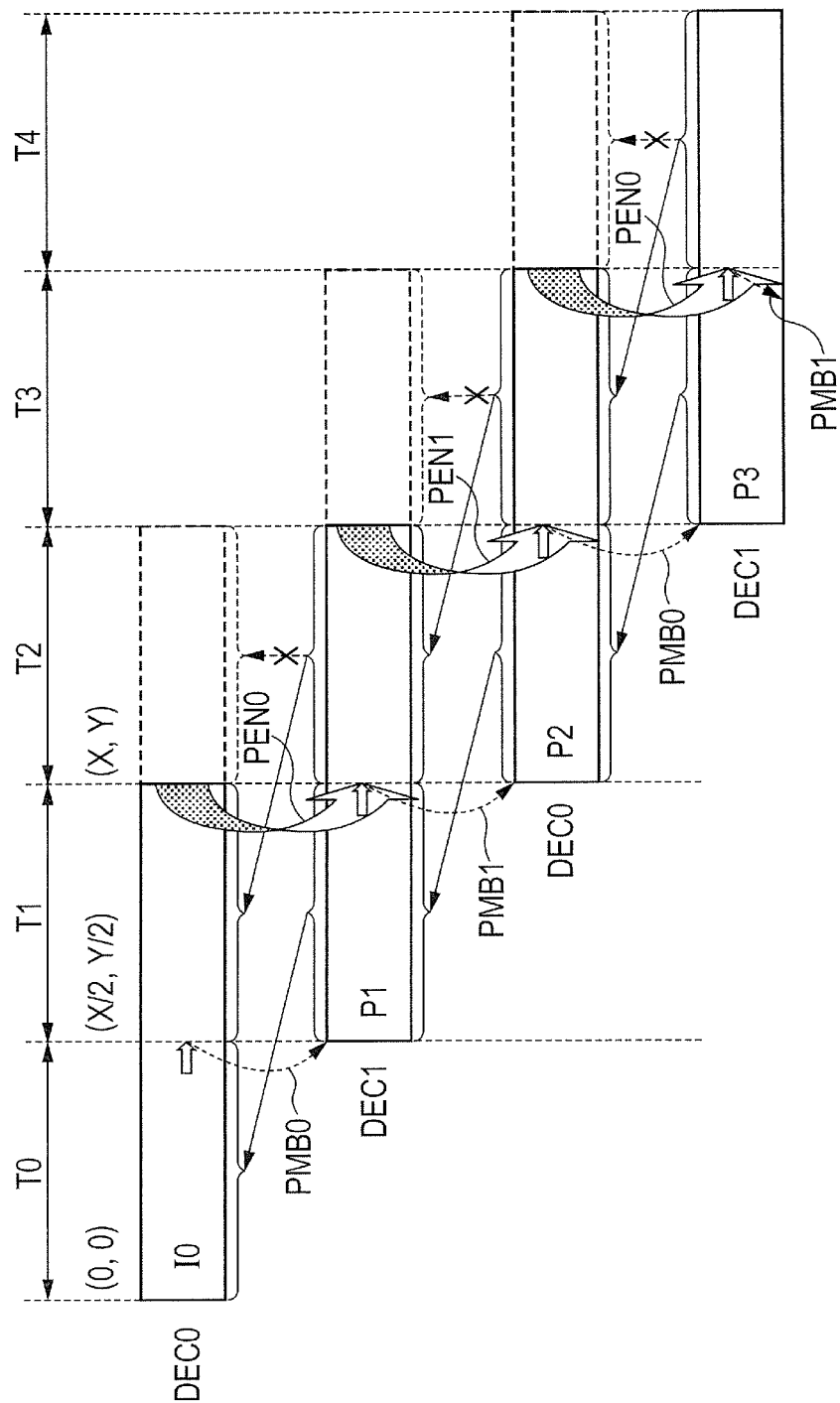
FIG. 2 is a diagram explaining the operation of the moving-picture decoding processing apparatus according to the first embodiment illustrated in FIG. 1.

In response to reach of the intermediate point of the process of decoding the second preceding frame by the second decoding processing unit in the second period (T1), coded information from the start point (0, 0) to an intermediate point (X/2, Y/2) of a first subsequent frame (P2) included in the first plurality of frames is subjected to a decoding process by the first decoding processing unit (20) in the third period (refer to FIGS. 1 and 2).

According to the embodiment, deterioration of the parallel processing capability can be reduced.

In a preferred embodiment, in response to a second end signal (PEN1) indicative of reach of the end point (X, Y) of the process of decoding the second preceding frame (P1) by the second decoding processing unit (21) in the third period, in a fourth period (T3), the coded information from the intermediate point (X/2, Y/2) to the endpoint (X, Y) of the first subsequent frame (P2) is subjected to a decoding process by the first decoding processing unit (20).

For a process of decoding the coded information from the intermediate point (X/2, Y/2) to the end point (X, Y) of the first subsequent frame (P2) by the first decoding processing unit (20) in the fourth period (T3), in response to the second end signal (PENT), use of a result of the decoding process by the second decoding processing unit (21) in the fourth period (T3) is inhibited.

For a process of decoding the coded information of the first subsequent frame (P2) by the first decoding processing unit (20) in the fourth period (T3), use of a result of the decoding process of the second preceding process (P1) by the second preceding processing unit (21) in the third period (T2) is permitted.

In response to reach of the intermediate point (X/2, Y/2) of the process of decoding the first subsequent frame by the first decoding processing unit (20) in the third period, in the fourth period, coded information from the start point (0, 0) to an intermediate point (X/2, Y/2) of a second subsequent frame (P3) included in the second plurality of frames is subjected to a decoding process by the second decoding processing unit (21) (refer to FIGS. 1 and 2).

In another preferred embodiment, each of the first and second decoding processing units (20) and (21) includes a variable-length decoding unit (201), an inverse quantizing unit (202), an inverse transforming unit (203), a selector unit (204), a motion compensating unit (205), an intra-predicting unit (206), an adding unit (207), and a filter unit (208) (refer to FIG. 1).

In further another preferred embodiment, the decoding control unit (10), the first decoding processing unit (20), and the second decoding processing unit (21) are integrated in a semiconductor chip of a semiconductor integrated circuit (refer to FIG. 1).

In a concrete embodiment, the moving-picture decoding processing apparatus decodes the coded bit stream (BS) conformed to the H.264/AVC standard or H.265/HEVC standard (refer to FIGS. 1 and 2).

[2] A moving-picture coding processing apparatus as a representative embodiment includes a coding control unit (10, 30), a first coding processing unit (50), and a second coding processing unit (51).

Video input signals (VS) as an object to be coded including moving-picture signals of a first plurality of frames (I0, P2) and moving-picture signals of a second plurality of frames (P1, P3) are supplied to the coding control unit (10, 30).

The moving-picture signals of the first plurality of frames (I0, P2) are supplied from the coding control unit (10, 30) to the first coding processing unit (50), and the moving-picture signals of the second plurality of frames (P1, P3) are supplied from the coding control unit (10, 30) to the second coding processing unit (51).

In a first period (T0), the moving-picture signals from a start point (0, 0) of a first preceding frame (I0) included in the first plurality of frames (I0, P2) to an intermediate point (X/2, Y/2) are subjected to a coding process by the first coding processing unit (50).

In response to reach of the intermediate point of the coding process of the first preceding frame by the first coding processing unit in the first period, in a second period (T1), the moving-picture signals from a start point (0, 0) of a second preceding frame (P1) included in the second plurality of frames (P1, P3) to an intermediate point (X/2, Y/2) are subjected to a coding process by the second coding processing unit (51).

In the second period (T1), the moving-picture signals from the intermediate point (X/2, Y/2) of the first preceding frame (I0) included in the first plurality of frames (I0, P2) to an end point (X, Y) are subjected to a coding process by the first coding processing unit (50).

In response to a first end signal (PEN0) indicative of reach of the end point (X, Y) of the coding process of the first preceding frame (I0) by the first coding processing unit (50) in the second period (T1), in a third period (T2), the moving-picture signals from the intermediate point (X/2, Y/2) to an end point (X, Y) of the second preceding frame (P1) are subjected to a coding process by the second decoding processing unit (51).

For a process of coding the moving-picture signals from the intermediate point (X/2, Y/2) to the end point (X, Y) of the second preceding frame (P1) by the second coding processing unit (51) in the third period (T2), in response to the first end signal (PEN0), use of a result of the coding process by the first coding processing unit (50) in the third period (T2) is inhibited.

For a process of coding the moving-picture signals of the second preceding frame (P1) by the second coding processing unit (51) in the third period (T2), use of a result of the coding process of the first preceding frame (I0) by the first coding processing unit (50) in the second period (T1) is permitted.

Figure 3:
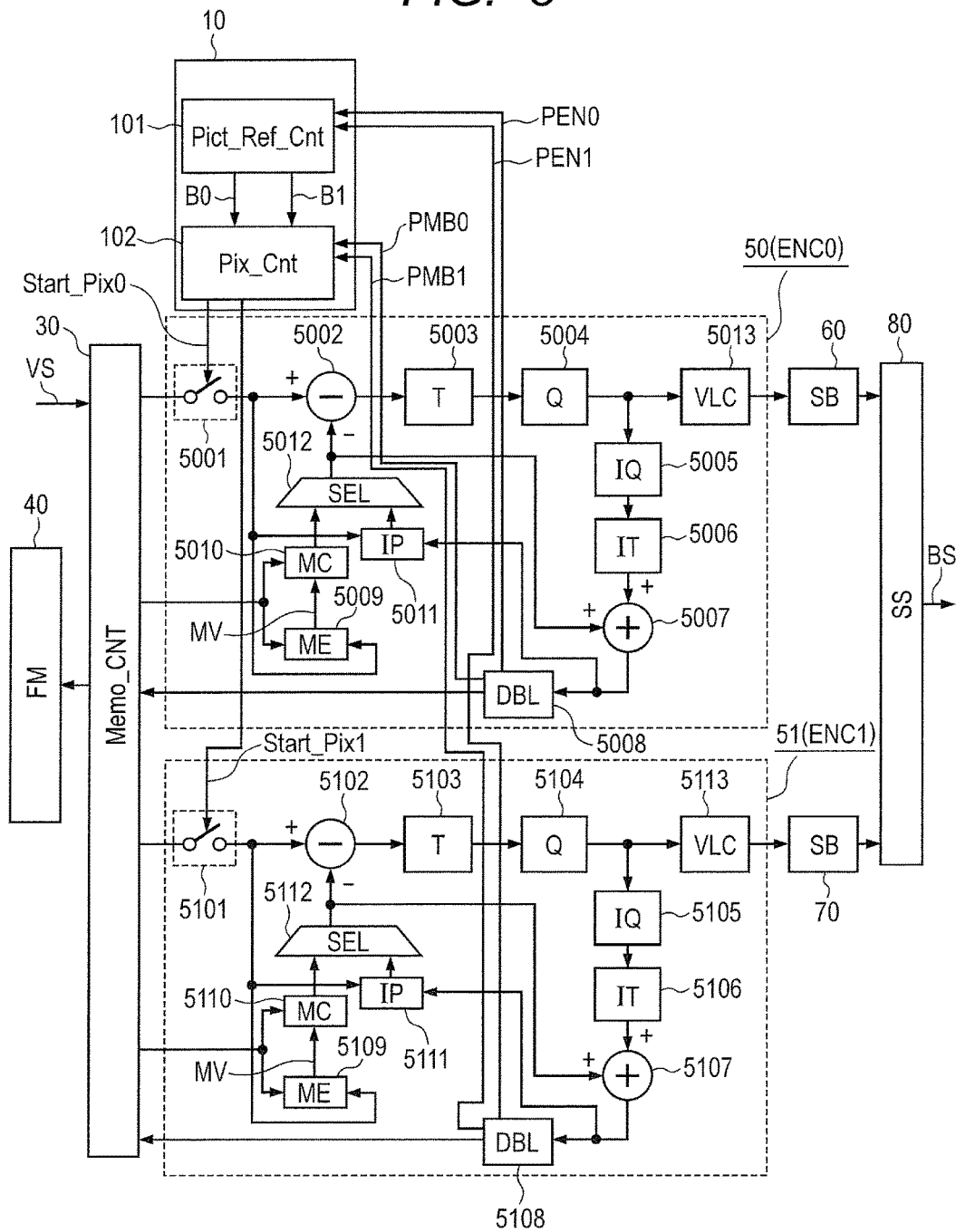
FIG. 3 is a diagram illustrating the configuration of a moving-picture coding processing apparatus according to a second embodiment.
Figure 4:
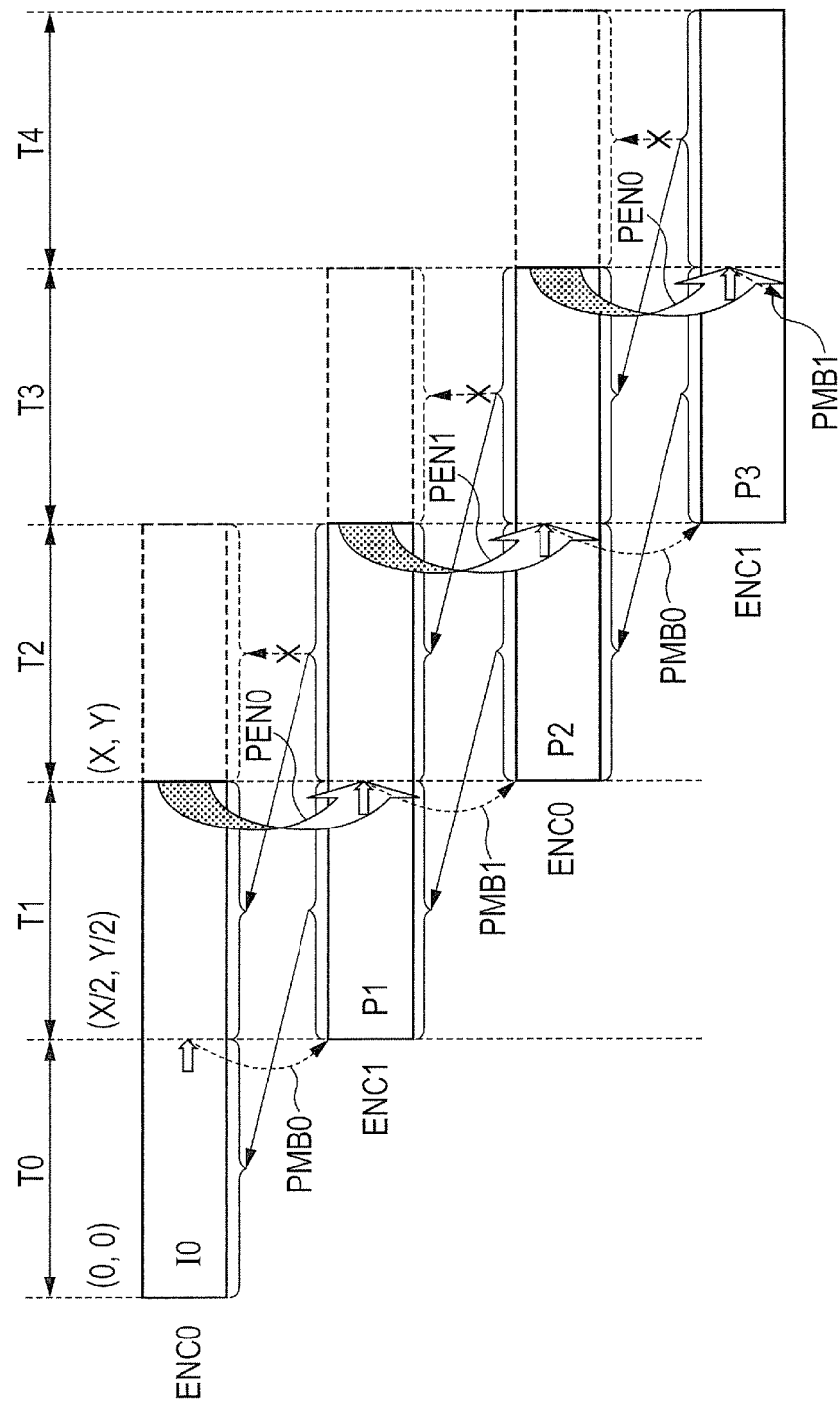
FIG. 4 is a diagram explaining the operation of the moving-picture coding processing apparatus according to the second embodiment illustrated in FIG. 3.

In response to reach of the intermediate point of the process of coding the second preceding frame by the second coding processing unit in the second period, coded information from the start point (0, 0) to an intermediate point (X/2, Y/2) of a first subsequent frame (P2) included in the first plurality of frames is subjected to a coding process by the first coding processing unit (50) in the third period (T2) (refer to FIGS. 3 and 4).

According to the embodiment, deterioration in the parallel processing capability can be lessened.

In a preferred embodiment, in response to a second end signal (PEN1) indicative of reach of the end point of the process of coding the second preceding frame by the second coding processing unit in the third period, in a fourth period (T3), the moving-picture signals from the intermediate point (X/2, Y/2) to the end point (X, Y) of the first subsequent frame (P2) are subjected to a coding process by the first coding processing unit (50).

For a process of coding the moving-picture signals from the intermediate point (X/2, Y/2) to the end point (X, Y) of the first subsequent frame (P2) by the first coding processing unit (50) in the fourth period (T3), in response to the second end signal (PEN1), use of a result of the coding process by the second coding processing unit (51) in the fourth period (T3) is inhibited.

For a process of coding the moving-picture signals of the first subsequent frame (P2) by the first coding processing unit (50) in the fourth period (T3), use of a result of the coding process of the second preceding frame (P1) by the second coding processing unit (51) in the third period (T2) is permitted.

In response to reach of the intermediate point of the process of coding the first subsequent frame by the first coding processing unit in the third period, the moving-picture signals from the start point (0, 0) to an intermediate point (X/2, Y/2) of a second subsequent frame (P3) included in the second plurality of frames are subjected to a coding process by the second coding processing unit (51) in the fourth period (T3) (refer to FIGS. 3 and 4).

In another preferred embodiment, each of the first coding processing unit (50) and the second coding processing unit (51) includes a subtracter, a frequency transforming unit, a quantizing unit, an inverse quantizing unit, an inverse frequency transforming unit, an adder, a filter unit, a motion vector detecting unit, a motion compensating unit, an intra-predicting unit, a selector unit, and a variable-length coding unit (refer to FIG. 3).

In further another preferred embodiment, the coding control unit (10, 30), the first coding processing unit (50), and the second coding processing unit (51) are integrated in a semiconductor chip of a semiconductor integrated circuit (refer to FIG. 1).

In a concrete embodiment, the moving-picture coding processing apparatus generates the coded bit stream (BS) conformed to the H.264/AVC standard or H.265/HEVC standard by coding video input signals (VS) (refer to FIGS. 3 and 4).

[3] A representative embodiment relates to an operating method of a moving-picture decoding processing apparatus having a decoding control unit (10), a first decoding processing unit (20), and a second decoding processing unit (21).

The decoding control unit (10) generates coded information of a first plurality of frames (I0, P2) and coded information of a second plurality of frames (P1, P3) from a coded bit stream (BS).

The coded information of the first plurality of frames (I0, P2) is supplied from the decoding control unit (10) to the first decoding processing unit (20), and the coded information of the second plurality of frames (P1, P3) is supplied from the decoding control unit (10) to the second decoding processing unit (21).

In a first period (T0), the coded information from a start point (0, 0) to an intermediate point (X/2, Y/2) of a first preceding frame (I0) included in the first plurality of frames (I0, P2) is subjected to a decoding process by the first decoding processing unit (20).

In response to reach of the intermediate point (X/2, Y/2) of the decoding process of the first preceding frame (I0) by the first decoding processing unit (20) in the first period, in a second period (T1), the coded information from a start point (0, 0) to an intermediate point (X/2, Y/2) of a second preceding frame (P1) included in the second plurality of frames (P1, P3) is subjected to a decoding process by the second decoding processing unit (21).

In the second period (T1), the coded information from the intermediate point (X/2, Y/2) to an end point (X, Y) of the first preceding frame (I0) included in the first plurality of frames (I0, P2) is subjected to a decoding process by the first decoding processing unit (20).

In response to a first end signal (PEN0) indicative of reach of the end point (X, Y) of the decoding process of the first preceding frame (I0) by the first decoding processing unit (20) in the second period (T1), in a third period (T2), the coded information from the intermediate point (X/2, Y/2) to an end point (X, Y) of the second preceding frame (P1) is subjected to a decoding process by the second decoding processing unit (21).

For a process of decoding the coded information from the intermediate point (X/2, Y/2) to the end point (X, Y) of the second preceding frame (P1) by the second decoding processing unit (21) in the third period (T2), in response to the first end signal (PEN0), use of a result of the decoding process by the first decoding processing unit (20) in the third period (T2) is inhibited.

For a process of decoding the coded information of the second preceding frame (P1) by the second decoding processing unit (21) in the third period (T2), use of a result of the decoding process of the first preceding frame (I0) by the first decoding processing unit (20) in the second period (T1) is permitted.

In response to reach of the intermediate point of the process of decoding the second preceding frame (P1) by the second decoding processing unit in the second period, coded information from the start point (0, 0) to an intermediate point (X/2, Y/2) of a first subsequent frame (P2) included in the first plurality of frames is subjected to a decoding process by the first decoding processing unit (20) in the third period (T2) (refer to FIGS. 1 and 2).

According to the embodiment, deterioration in the parallel processing capability can be lessened.

[4] A representative embodiment relates to an operating method of a moving-picture coding processing apparatus having a coding control unit (10, 30), a first coding processing unit (50), and a second coding processing unit (51).

Video input signals (VS) to be coded including moving-picture signals of a first plurality of frames (I0, P2) and moving-picture signals of a second plurality of frames (P1, P3) are supplied to the coding control unit (10, 30).

The moving-picture signals of the first plurality of frames (I0, P2) are supplied from the coding control unit (10, 30) to the first coding processing unit (50), and the moving-picture signals of the second plurality of frames (P1, P3) are supplied from the coding control unit (10, 30) to the second coding processing unit (51).

In a first period (T0), the moving-picture signals from a start point (0, 0) to an intermediate point (X/2, Y/2) of a first preceding frame (I0) included in the first plurality of frames (I0, P2) are subjected to a coding process by the first coding processing unit (50).

In response to reach of the intermediate point (X/2, Y/2) of the coding process of the first preceding frame (I0) by the first coding processing unit in the first period, in a second period (T1), the moving-picture signals from a start point (0, 0) to an intermediate point (X/2, Y/2) of a second preceding frame (P1) included in the second plurality of frames are subjected to a coding process by the second coding processing unit (51).

In the second period (T1), the moving-picture signals from the intermediate point (X/2, Y/2) to the end point (X, Y) of the first preceding frame (I0) included in the first plurality of frames (I0, P2) are subjected to a coding process by the first coding processing unit (50).

In response to a first end signal (PEN0) indicative of reach of the end point (X, Y) of the coding process of the first preceding frame (I0) by the first coding processing unit (50) in the second period (T1), in a third period (T2), the moving-picture signals from the intermediate point (X/2, Y/2) to an end point (X, Y) of the second preceding frame (P1) are subjected to a coding process by the second decoding processing unit (51).

For a process of coding the moving-picture signals from the intermediate point (X/2, Y/2) to the end point (X, Y) of the second preceding frame (P1) by the second coding processing unit (51) in the third period (T2), in response to the first end signal (PEN0), use of a result of the coding process by the first coding processing unit (50) in the third period (T2) is inhibited.

For a process of coding the moving-picture signals of the second preceding frame (P1) by the second coding processing unit (51) in the third period (T2), use of a result of the coding process of the first preceding frame (I0) by the first coding processing unit (50) in the second period (T1) is permitted.

In response to reach of the intermediate point of the process of coding the second preceding frame (P1) by the second coding processing unit in the second period, coded information from the start point (0, 0) to an intermediate point (X/2, Y/2) of a first subsequent frame (P2) included in the first plurality of frames is subjected to a coding process by the first coding processing unit (50) in the third period (T2) (refer to FIGS. 3 and 4).

According to the embodiment, deterioration in the parallel processing capability can be lessened.

2. Details of Embodiments

Next, the embodiments will be described more specifically. In all of the drawings for explaining the best modes for carrying out the invention, the same reference numerals are designated to parts having the same functions as those of the foregoing drawings, and their description will not be repeated.

First Embodiment
Configuration of Moving-Picture Decoding Processing Apparatus

FIG. 1 is a diagram illustrating the configuration of a moving-picture decoding processing apparatus according to a first embodiment.

A moving-picture decoding processing apparatus of the first embodiment illustrated in FIG. 1 has a decoding control unit 10, a first decoding processing unit 20 (DEC0), a second decoding processing unit 21 (DEC1), a memory control unit 30, and a frame memory 40.

A coded bit stream BS generated by a not-illustrated moving-picture coding apparatus is supplied to the decoding control unit 10, and coded information of each of a first I frame I0, a second P frame P1, a third P frame P2, and a fourth P frame P3 is generated from the decoding control unit 10.

Also in the first embodiment illustrated in FIG. 1, to reduce hardware of the moving-picture decoding processing apparatus executing parallel decoding processing, coded information of the first I frame I0 and the third P frame P2 as the odd-numbered frames is decoded by the first decoding processing unit 20 (DEC0), and coded information of the second P frame P1 and the fourth P frame P3 of the even-numbered frames is decoded by the second decoding processing unit 21 (DEC1).

The first I frame I0 as an odd-numbered frame includes coded information at the start point (0, 0), an intermediate point (X/2, Y/2), and the end point (X, Y) of a raster scan on a moving-picture coding screen which is set in the pixel size of high definition (HD). Specifically, the moving-picture coding screen which is set in the pixel size of high definition (HD) has X pieces of pixels in the horizontal direction and Y pieces of pixels in the vertical direction. Each of the second P frame P1 as an even-numbered frame, the third P frame P2 as an odd-numbered frame, and the fourth P frame P3 as an even-numbered frame includes coded information at the start point (0, 0), the intermediate point (X/2, Y/2), and the end point (X, Y) of the raster scan on the moving-picture coding screen which is set in the pixel size of high definition (HD).

Decoding Control Unit

The decoding control unit 10 executes parsing (syntax interpretation) of the bit stream BS coded in conformity to the H.264/AVC standard or H.265/HEVC standard by the not-illustrated moving picture coding apparatus. That is, the decoding control unit 10 executes parsing of the syntax of the coded bit stream BS (the rule of a compression coded data string or a method of configuring a bit stream of coded data). As a result, the decoding control unit 10 executes frame division of the coded bit stream BS, so that the coded information of the first I frame I0 and the third P frame P2 as odd-numbered frames is supplied to the first decoding processing unit 20 (DEC0), and the coded information of the second P frame P1 and the fourth P frame P3 as even-numbered frames is supplied to the second decoding processing unit 21 (DEC1).

Further, the decoding control unit 10 includes a picture reference control unit 101 and a process block control unit 102. Frame decoding process end signals PEN0 and PEN1 are supplied from the first and second decoding processing units 20 (DEC0) and 21 (DEC1) to the picture reference control unit 101, and picture reference control signals B0 and B1 are supplied from the picture reference control unit 101 to the process block control unit 102. Block process start signals Start_MB0 and Start_MB1 are supplied from the process block control unit 102 to the first and second decoding processing units 20 (DEC0) and 21 (DEC1), and process block signals PMB0 and PMB1 are supplied from the first and second decoding processing units 20 (DEC0) and 21 (DEC1) to the process block control unit 102.

First and Second Decoding Processing Units

The first decoding processing unit 20 (DEC0) includes a variable-length decoding unit 201, an inverse quantizing unit 202, an inverse transforming unit 203, a selector unit 204, a motion compensating unit 205, an intra-predicting unit 206, an adding unit 207, and a filter unit 208.

The second decoding processing unit 21 (DEC1) similarly includes a variable-length decoding unit 211, an inverse quantizing unit 212, an inverse transforming unit 213, a selector unit 214, a motion compensating unit 215, an intra-predicting unit 216, an adding unit 217, and a filter unit 218.

Since the variable-length decoding unit 201 of the first decoding processing unit 20 (DEC0) functions as an entropy decoding unit which executes variable length decoding, it inverts the entropy codes of the coded information of the first I frame I0 and the third P frame P2, thereby decoding a prediction mode coded by a not-illustrated moving-picture coding apparatus. In the case where the decoded prediction mode is an intra-prediction mode, the variable-length decoding unit 201 reconstructs information of an intra-prediction. On the other hand, in the case where the decoded prediction mode is an inter-prediction mode, the variable-length decoding unit 201 reconstructs a motion vector.

Since the variable-length decoding unit 211 of the second decoding processing unit 21 (DEC1) also functions as an entropy decoding unit which executes variable length decoding, it inverts the entropy codes of the coded information of the second I frame I1 and the fourth P frame P3, thereby decoding a prediction mode coded by a not-illustrated moving-picture coding apparatus. In the case where the decoded prediction mode is an intra-prediction mode, the variable-length decoding unit 211 reconstructs information of an intra-prediction. On the other hand, in the case where the decoded prediction mode is an inter-prediction mode, the variable-length decoding unit 211 reconstructs a motion vector.

The variable-length decoding unit 201, the inverse quantizing unit 202, the inverse transforming unit 203, the selector unit 204, the motion compensating unit 205, the intra-predicting unit 206, the adding unit 207, and the filter unit 208 of the first decoding processing unit 20 (DEC0) operate as follows.

A prediction residual component of luminance and a color different entropy-coded by the variable-length decoding unit 201 is supplied to the input terminal of the inverse quantizing unit 202 and is subjected to inverse-quantizing process by the inverse quantizing unit 202. An output signal of the inverse quantizing unit 202 is converted to a residual signal by execution of the process of inverse discrete cosine transform (DCT) or inverse discrete sine transform (DST) by the inverse transforming unit 203. That is, data of the frequency domain is supplied from the inverse quantizing unit 202 to the inverse transforming unit 203 and converted to the residual signal.

The residual signal is supplied from the inverse transforming unit 203 to the first input terminal of the adding unit 207, and prediction information is supplied from the selector unit 204 to the second input terminal of the adding unit 207. In the case where the inter-prediction mode is shown by a decoding moving picture stream, the selector unit 204 selects a predicted prediction signal from the motion compensating unit 205. In the case where the intra-prediction mode is shown by a decoding moving picture stream, the selector unit 204 selects a prediction signal from the intra-predicting unit 206.

The motion compensating unit 205 generates a prediction signal by using the reference data from the frame memory 40 and the memory control unit 30 and applying motion prediction calculated by the moving-picture decoding processing apparatus and transferred by the coded motion-picture bit stream. That is, the motion compensating unit 205 generates a prediction signal by using a motion vector MV from the variable-length decoding unit 201 and reference data Ref_Pict from the frame memory 40.

The intra-predicting unit 206 generates a prediction signal by using peripheral pixels decoded before the present block as the reference data Ref_Pict and applying the intra-prediction calculated by the moving-picture decoding processing apparatus designated by the intra-prediction mode transferred by the coded moving-picture bit stream. That is, the intra-predicting unit 206 generates a prediction signal by using a spatial prediction mode SPM from the variable-length decoding unit 201 and the reference data Ref_Pict from the frame memory 40.

The adding unit 207 adds the residual signal supplied from the inverse transforming unit 203 and the prediction signal selected by the selector unit 204, thereby generating a decoded video signal VS. The decoded video signal VS generated by the adding unit 207 is supplied to a not-illustrated display device via the filter unit 208, the memory control unit 30, and the frame memory 40.

The filter unit 208 has the function of a deblocking filter for reducing a block distortion in conformity to the H.264/AVC standard. In addition to the deblocking filter function, to be conformed to the H.265/HEVC standard, the filter unit 208 also has a filter function called the sample adaptive offset (SAO). The filter function is to preferably reconstruct the original signal amplitude by using a lookup table written with an additional parameter determined by frequency distribution analysis on the moving-picture coding processing apparatus side. An output signal of the adding unit 207 is supplied to the input terminal of the filter unit 208, and the decoded video signal VS is generated from the output terminal of the filter unit 208 and supplied to the not-illustrated display device. The generated decoded video signal VS is stored as reference data Ref_Pict in the frame memory 40.

Since the variable-length decoding unit 211, the inverse transforming unit 213, the selector unit 214, the motion compensating unit 215, the intra-predicting unit 216, the adding unit 217, and the filter unit 218 of the second decoding processing unit 21 (DEC1) operate in a manner similar to the case of the first decoding processing unit 20 (DEC0) described above, the description will not be repeated.

Particularly, in the first decoding processing unit 20 (DEC0), a reference data address signal Add_Ref_Pict for accessing the reference data Ref_Pict from the frame memory 40 is supplied from the variable-length decoding unit 201 to the frame memory 40 via the memory control unit 30. Similarly, also in the second decoding processing unit 21 (DEC1), the reference data address signal Add_Ref_Pict for accessing the reference data Ref_Pict from the frame memory 40 is supplied from the variable-length decoding unit 211 to the frame memory 40 via the memory control unit 30.

In the case where the moving-picture decoding processing apparatus of the first embodiment illustrated in FIG. 1 executes the decoding processing operation in conformity to the H.264/AVC standard, the reference data Ref_Pict accessed from the frame memory 40 becomes picture reference data of a macro block (MB) having a size of 16 pixels by 16 pixels with a brightness component. On the other hand, in the case where the moving-picture decoding processing apparatus of the first embodiment illustrated in FIG. 1 executes the decoding processing operation in conformity to the H.265/HEVC standard, the reference data Ref_Pict accessed from the frame memory 40 becomes picture reference data of a largest coding unit (LCU) having a size of 64 pixels by 64 pixels.

Further, a block process start signal Start_MB0 generated from the process block control unit 102 of the decoding control unit 10 is supplied to the variable-length decoding unit 201 of the first decoding processing unit 20 (DEC0), and a block process start signal Start_MB1 generated from the process block control unit 102 of the decoding control unit 10 is similarly supplied also to the variable-length decoding unit 211 of the second decoding processing unit 21 (DEC1).

In the case where the moving-picture decoding processing apparatus of the first embodiment illustrated in FIG. 1 executes the decoding processing operation in conformity to the H.264/AVC standard, the block process start signals Start_MB0 and Start_MB1 instruct serial numbers of the macro block (MB) from which the decoding process starts. On the other hand, in the case where the moving-picture decoding processing apparatus of the first embodiment illustrated in FIG. 1 executes the decoding processing operation in conformity to the H.265/HEVC standard, the block process start signals Start_MB0 and Start_MB1 instruct serial numbers of the largest coding unit (LCU) from which the decoding process starts.

Further, the process block signal PMB0 generated from the filter unit 208 of the first decoding processing unit 20 (DEC0) is supplied to the process block control unit 102 of the decoding control unit 10, and the process block signal PMB1 generated from the filter unit 218 of the second decoding processing unit 21 (DEC1) is supplied to the process block control unit 102 of the decoding control unit 10. The process block signal PMB0 indicates the position of a process block which is being processed by the filter unit 208 in the first decoding processing unit 20 (DEC0), and the process block signal PMB1 also indicates the position of a process block which is being processed by the filter unit 218 in the second decoding processing unit 21 (DEC1).

In the case where the moving-picture decoding processing apparatus of the first embodiment illustrated in FIG. 1 executes the decoding processing operation in conformity to the H.264/AVC standard, the process block signals PMB0 and PMB1 instruct serial numbers of the macro block (MB) which is to be subjected to the inter-decoding process or intra-decoding process by the decoding processing units 20 (DEC0) and 21 (DEC1). On the other hand, in the case where the moving-picture decoding processing apparatus of the first embodiment illustrated in FIG. 1 executes the decoding processing operation in conformity to the H.265/HEVC standard, the process block signals PMB0 and PMB1 instruct serial numbers of the largest coding unit (LCU) which is to be subjected to the inter-decoding process or intra-decoding process by the decoding processing units 20 (DEC0) and 21 (DEC1).

Further, the frame decoding process end signal PEN0 generated from the filter unit 208 of the first decoding processing unit 20 (DEC0) is supplied to the picture reference control unit 101 of the decoding control unit 10, and the frame decoding process end signal PEN1 generated from the filter unit 218 of the second decoding processing unit 21 (DEC1) is supplied to the picture reference control unit 101 of the decoding control unit 10.

In the case where the moving-picture decoding processing apparatus of the first embodiment illustrated in FIG. 1 executes the decoding processing operation in conformity to the H.264/AVC standard, the frame decoding process end signals PEN0 and PEN1 indicate completion of the inter-decoding process or intra-decoding process of the macro block (MB) at the endpoint (X, Y) in the frame. On the other hand, in the case where the moving-picture decoding processing apparatus of the first embodiment illustrated in FIG. 1 executes the decoding processing operation in conformity to the H.265/HEVC standard, the frame decoding process end signals PEN0 and PEN1 indicate completion of the inter-decoding process or intra-decoding process of the largest coding unit (LCU) at the end point (X, Y) in the frame.

Use of Semiconductor Integrated Circuit

A most part of the moving-picture decoding processing apparatus according to the first embodiment illustrated in FIG. 1 is integrated in the semiconductor chip of a system LSI semiconductor integrated circuit called a system on chip (SoC). The frame memory 40, however, is integrated in the semiconductor chip of a synchronous static random access memory (SRAM) configured separately from the system LSI semiconductor integrated circuit. Therefore, the decoding control unit 10, the first decoding processing unit 20 (DEC0), the second decoding processing unit 21 (DEC1), and the memory control unit 30 are integrated in the semiconductor chip of a system on chip (SoC).

Operation of Moving-Picture Decoding Processing Apparatus

FIG. 2 is a diagram explaining the operation of the moving-picture decoding processing apparatus according to the first embodiment illustrated in FIG. 1.

Single Decoding Process in First Period

Since coded information of the first I frame I0 as an odd-numbered frame is supplied to the first decoding processing unit 20 (DEC0) by frame division of the coded bit stream BS by the decoding control unit 10 as described above, in the first period T0, the first decoding processing unit 20 (DEC0) starts the process of decoding the coded information at the start point (0, 0) of the first I frame I0. Specifically, the block process start signal Start_MB0 is supplied from the process block control unit 102 of the decoding control unit 10 to the variable-length decoding unit 201 of the first decoding processing unit 20 (DEC0), and a serial number of the macro block (MB) or the largest coding unit (LCU) from which the decoding process is started is instructed by the block process start signal Start_MB0. As the process block control unit 102 of the decoding control unit 10 increments the value of the block process start signal Start_MB0, the first decoding processing unit 20 (DEC0) makes progress on the decoding process of coded information from the start point (0, 0) of the first I frame I0 toward the intermediate point (X/2, Y/2). In the first period T0 since the first decoding processing unit 20 (DEC0) starts the process of decoding the coded information at the start point (0, 0) of the first I frame I0 until it starts the process of decoding the coded information at the intermediate point (X/2, Y/2) of the first I frame I0, a single decoding process such that only the first decoding processing unit 20 (DEC0) executes the decoding process and the second decoding processing unit 21 (DEC1) stops the decoding process is executed.

Parallel Decoding Process in Second Period

In the second period T1 since the first decoding processing unit 20 (DEC0) starts the process of decoding the coded information at the intermediate point (X/2, Y/2) of the first I frame I0 until it ends the process of decoding the coded information at the end point (X, Y) of the first I frame I0, a parallel decoding process such that the first decoding processing unit 20 (DEC0) and the second decoding processing unit 21 (DEC1) execute the decoding process is executed. Specifically, reach of the process of decoding the first I frame I0 started from the start point (0, 0) to the intermediate point (X/2, Y/2) by the first decoding processing unit 20

(DEC0) is detected by a change from the low level "0" to the high level "1" of the process block signal PMB0 supplied from the filter unit 208 of the first decoding processing unit 20 (DEC0) to the process block control unit 102. In response to the detection result by the process block signal PMB0, the decoding process in the first half of the second P frame P1 by the second decoding processing unit 21 (DEC1) is started from the start point (0, 0).

Specifically, in response to the change from the low level "0" to the high level "1" of the process block signal PMB0, in the second period T1, the second decoding processing unit 21 (DEC1) starts the process of decoding the coded information at the start point (0, 0) of the second P frame P1. Concretely, the block process start signal Start_MB1 is supplied from the process block control unit 102 of the decoding control unit 10 to the variable-length decoding unit 211 of the second decoding processing unit 21 (DEC1), and a serial number of the macro block (MB) or the largest coding unit (LCU) from which the decoding process is started is instructed by the block process start signal Start_MB1. As the process block control unit 102 of the decoding control unit 10 increments the value of the block process start signal Start_MB1, the second decoding processing unit 21 (DEC1) makes progress on the decoding process of coded information from the start point (0, 0) of the second P frame P1 toward the intermediate point (X/2, Y/2). In the second period T1 since the second decoding processing unit 21 (DEC1) starts the process of decoding the coded information at the start point (0, 0) of the second P frame P1 until it starts the process of decoding the coded information at the intermediate point (X/2, Y/2) of the second P frame P1, the parallel decoding process such that the first decoding processing unit 20 (DEC0) and the second decoding processing unit 21 (DEC1) execute the decoding process is executed. As reference picture information for the inter-decoding process in the first-half part of the second P frame P1 by the second decoding processing unit 21 (DEC1) in the parallel decoding process in the second period T1, a result of the intra-decoding process in the first-half part of the first I frame I0 by the first decoding processing unit 20 (DEC0) in the first period T0 is used by the second decoding processing unit 21 (DEC1).

Therefore, the second decoding processing unit 21 (DEC1) generates, in the second period T1, the reference data address signal Add_Ref_Pict for accessing the result of the intra-decoding process in the first-half part of the first I frame I0 by the first decoding processing unit 20 (DEC0) in the first period T0 as the reference picture information for the inter-decoding process in the first-half part of the second P frame P1. The reference data address signal Add_Ref_Pict for accessing the result of the intra-decoding process in the first-half part of the I frame I0 by the first decoding processing unit 20 (DEC0) in the first period T0 is supplied from the variable-length decoding unit 211 of the second decoding processing unit 21 (DEC1) to the frame memory 40 via the memory control unit 30 in the second period T1.
Parallel Decoding Process in Third Period Also in the third period T2 since the second decoding processing unit 21 (DEC1) starts the process of decoding the coded information at the intermediate point (X/2, Y/2) of the second P frame P1 until it ends the process of decoding the coded information at the end point (X, Y) of the second P frame P1, a parallel decoding process such that the first decoding processing unit 20 (DEC0) and the second decoding processing unit 21 (DEC1) execute the decoding process is executed. Specifically, at the final timing of the second period T1, the frame decoding process end signal PEN0 indicating completion of the inter-decoding process of the macro block (MB) or the largest coding unit (LCU) at the end point (X, Y) in the first I frame I0 by the first decoding processing unit 20 (DEC0) is supplied from the filter unit 208 of the first decoding processing unit 20 (DEC0) to the picture reference control unit 101. Therefore, in response to the frame decode process end signal PEN0, a picture reference control signal B0 supplied from the picture reference control unit 101 to the process block control unit 102 changes from the high level "1" to the low level "0", so that monitoring of the decoding process position of the first decoding processing unit 20 (DEC0) by the second decoding processing unit 21 (DEC1) in the third period T2 is stopped. Since the picture reference control signal B0 is maintained at the high level "1" before the frame decode process end signal PEN0 is supplied from the filter unit 208 of the first decoding processing unit 20 (DEC0) to the picture reference control unit 101 of the decoding control unit 10, monitoring of the decoding process position of the first decoding processing unit 20 (DEC0) by the second decoding processing unit 21 (DEC1) is permitted. As described above, in the third period T2, in response to the frame decoding process end signal PEN0 and the picture reference control signal B0, use of the result of the decoding process by the first decoding processing unit 20 (DEC0) as a reference picture for the inter-decoding process in the latter half of the second P frame P1 by the second decoding processing unit 21 (DEC1) is inhibited. In the third period T2, however, the result of the intra-decoding process in the latter half of the first I frame I0 by the first decoding processing unit 20 (DEC0) in the second period T1 can be used as a reference picture for the inter-decoding process in the latter half of the second P frame P1 by the second decoding processing unit 21 (DEC1).

Therefore, in the moving-picture decoding processing apparatus according to the first embodiment illustrated in FIGS. 1 and 2, in the third period T2, the first decoding processing unit 20 (DEC0) does not have to execute the no-operation (NOP) instruction and can execute the inter-decoding process of the first half of the third P frame P2. Consequently, deterioration in the parallel processing capability as described with reference to FIG. 7 can be lessened.

Further, reach of the decoding process of the second P frame P1 by the second decoding processing unit 21 (DEC1) from the start point (0, 0) to the intermediate point (X/2, Y/2) is detected by a change from the low level "0" to the high level "1" of the process block signal PMB1 supplied from the filter unit 218 of the second decoding processing unit 21 (DEC1) to the process block control unit 102 of the decoding control unit 10. In response to the detection result by the process block signal PMB1, the decoding process in the first half of the third P frame P2 by the first decoding processing unit 20 (DEC0) is started from the start point (0, 0).

Specifically, in response to the change from the low level "0" to the high level "1" of the process block signal PMB1, in the third period T2, the first decoding processing unit 20 (DEC0) starts the process of decoding the coded information at the start point (0, 0) of the third P frame P2. Concretely, the block process start signal Start_MB0 is supplied from the process block control unit 102 of the decoding control unit 10 to the variable-length decoding unit 201 of the first decoding processing unit 20 (DEC0), and a serial number of the macro block (MB) or the largest coding unit (LCU) from which the decoding process is started is instructed by the block process start signal Start_MB0. As the process block control unit 102 of the decoding control unit 10 increments the value of the block process start signal Start_MB0, the first decoding processing unit 20 (DEC0) makes progress on the decoding process of coded information from the start point (0, 0) of the third P frame P2 toward the intermediate point (X/2, Y/2). In the third period T2 since the first decoding processing unit 20 (DEC0) starts the process of decoding the coded information at the start point (0, 0) of the third P frame P2 until it starts the process of decoding the coded information at the intermediate point (X/2, Y/2) of the third P frame P2, the parallel decoding process such that the first decoding processing unit 20 (DEC0) and the second decoding processing unit 21 (DEC1) execute the decoding process is executed. As reference picture information for the inter-decoding process in the first-half part of the third P frame P2 by the first decoding processing unit 20 (DEC0) in the parallel decoding process in the third period T2, a result of the inter-decoding process in the first-half part of the second P frame P1 by the second decoding processing unit 21 (DEC1) in the second period T1 is used by the first decoding processing unit 20 (DEC0).

Therefore, the first decoding processing unit 20 (DEC0) generates, in the third period T2, the reference data address signal Add_Ref_Pict for accessing the result of the intra-decoding process in the first-half part of the second P frame P1 by the second decoding processing unit 21 (DEC1) in the second period T1 as the reference picture information for the inter-decoding process in the first-half part of the third P frame P2. That is, the reference data address signal Add Ref_Pict for accessing the result of the inter-decoding process in the first-half part of the P frame P1 by the second decoding processing unit 21 (DEC1) in the second period T1 is supplied from the variable-length decoding unit 201 of the first decoding processing unit 20 (DEC0) to the frame memory 40 via the memory control unit 30 in the third period T2.

Parallel Decoding Process in Fourth Period

Also in the fourth period T3 since the first decoding processing unit 20 (DEC0) starts the process of decoding the coded information at the intermediate point (X/2, Y/2) of the third P frame P2 until it ends the process of decoding the coded information at the endpoint (X, Y) of the third P frame P2, a parallel decoding process such that the first decoding processing unit 20 (DEC0) and the second decoding processing unit 21 (DEC1) execute the decoding process is executed. Specifically, the frame decoding process end signal PEN1 indicating completion of the inter-decoding process of the macro block (MB) or the largest coding unit (LCU) at the end point (X, Y) in the second P frame P1 by the second decoding processing unit 21 (DEC1) at the final timing of the third period T2 is supplied from the filter unit 218 of the second decoding processing unit 21 (DEC1) to the picture reference control unit 101. Therefore, a picture reference control signal B1 supplied from the picture reference control unit 101 to the process block control unit 102 changes from the high level "1" to the low level "0" in response to the frame decode process end signal PEN1, so that monitoring of the decoding process position of the second decoding processing unit 21 (DEC1) by the first decoding processing unit 20 (DEC0) in the fourth period T3 is stopped. Since the picture reference control signal B1 is maintained at the high level "1" before the frame decode process end signal PEN1 is supplied from the filter unit 218 of the second decoding processing unit 21 (DEC1) to the picture reference control unit 101 of the decoding control unit 10, monitoring of the decoding process position of the second decoding processing unit 21 (DEC1) by the first decoding processing unit 20 (DEC0) is permitted. As described above, in the fourth period T3, in response to the frame decoding process end signal PEN1 and the picture reference control signal B1, use of the result of the decoding process by the second decoding processing unit 21 (DEC1) in the fourth period T3 as a reference picture for the inter-decoding process in the latter half of the third P frame P2 by the first decoding processing unit 20 (DEC0) is inhibited. In the fourth period T3, however, the result of the inter-decoding process in the latter half of the second P frame P1 by the second decoding processing unit 21 (DEC1) in the third period T2 can be used as a reference picture for the inter-decoding process in the latter half of the third P frame P2 by the first decoding processing unit 20 (DEC0).

Therefore, in the moving-picture decoding processing apparatus according to the first embodiment illustrated in FIGS. 1 and 2, in the fourth period T3, the second decoding processing unit 21 (DEC1) does not have to execute the no-operation (NOP) instruction and can execute the inter-decoding process of the first half of the fourth P frame P3. Consequently, deterioration in the parallel processing capability as described with reference to FIG. 7 can be lessened.

Further, reach of the decoding process of the third P frame P2 by the first decoding processing unit 20 (DEC0) from the start point (0, 0) to the intermediate point (X/2, Y/2) is detected by a change from the low level "0" to the high level "1" of the process block signal PMB0 supplied from the filter unit 208 of the first decoding processing unit 20 (DEC0) to the process block control unit 102 of the decoding control unit 10. In response to the detection result by the process block signal PMB0, the decoding process in the first half of the fourth P frame P3 by the second decoding processing unit 21 (DEC1) is started from the start point (0, 0).

Specifically, in response to the change from the low level "0" to the high level "1" of the process block signal PMB0, in the fourth period T3, the second decoding processing unit 21 (DEC1) starts the process of decoding the coded information at the start point (0, 0) of the fourth P frame P3. Concretely, the block process start signal Start_MB1 is supplied from the process block control unit 102 of the decoding control unit 10 to the variable-length decoding unit 211 of the second decoding processing unit 21 (DEC1), and a serial number of the macro block (MB) or the largest coding unit (LCU) from which the decoding process is started is instructed by the block process start signal Start_MB1. As the process block control unit 102 of the decoding control unit 10 increments the value of the block process start signal Start_MB1, the second decoding processing unit 21 (DEC1) makes progress on the decoding process of coded information from the start point (0, 0) of the fourth P frame P3 toward the intermediate point (X/2, Y/2). In the fourth period T3 since the second decoding processing unit 21 (DEC1) starts the process of decoding the coded information at the start point (0, 0) of the fourth P frame P3 until it starts the process of decoding the coded information at the intermediate point (X/2, Y/2) of the fourth P frame P3, the parallel decoding process such that the first decoding processing unit 20 (DEC0) and the second decoding processing unit 21 (DEC1) execute the decoding process is executed. As reference picture information for the inter-decoding process in the first-half part of the fourth P frame P3 by the second decoding processing unit 21 (DEC1) in the parallel decoding process in the fourth period T3, a result of the inter-decoding process in the first-half part of the third P frame P2 by the first decoding processing unit 20 (DEC0) in the third period T2 is used by the second decoding processing unit 21 (DEC1).

Therefore, the second decoding processing unit 21 (DEC1) generates, in the fourth period T3, the reference data address signal Add_Ref_Pict for accessing the result of the intra-decoding process in the first-half part of the third P frame P2 by the first decoding processing unit 20 (DEC0) in the third period T2 as the reference picture information for the inter-decoding process in the first-half part of the fourth P frame P3. That is, the reference data address signal Add_Ref_Pict for accessing the result of the inter-decoding process in the first-half part of the P frame P2 by the first decoding processing unit 20 (DEC0) in the third period T2 is supplied from the variable-length decoding unit 211 of the second decoding processing unit 21 (DEC1) to the frame memory 40 via the memory control unit 30 in the fourth period T3.

Parallel Decoding Process in Fifth Period

Also in the fifth period T4 since the second decoding processing unit 21 (DEC1) starts the process of decoding the coded information at the intermediate point (X/2, Y/2) of the fourth P frame P3 until it ends the process of decoding the coded information at the end point (X, Y) of the fourth P frame P3, a parallel decoding process such that the first decoding processing unit 20 (DEC0) and the second decoding processing unit 21 (DEC1) execute the decoding process is executed. Specifically, the frame decoding process end signal PEN0 indicating completion of the inter-decoding process of the macro block (MB) or the largest coding unit (LCU) at the end point (X, Y) in the third P frame P2 by the first decoding processing unit 20 (DEC0) at the final timing of the fourth period T3 is supplied from the filter unit 208 of the first decoding processing unit 20 (DEC0) to the picture reference control unit 101 of the decoding control unit 10. Therefore, a picture reference control signal B0 supplied from the picture reference control unit 101 to the process block control unit 102 changes from the high level "1" to the low level "0" in response to the frame decode process end signal PEN0, so that monitoring of the decoding process position of the first decoding processing unit 20 (DEC0) by the second decoding processing unit 21 (DEC1) in the fifth period T4 is stopped. Since the picture reference control signal B0 is maintained at the high level "1" before the frame decode process end signal PEN0 is supplied from the filter unit 208 of the first decoding processing unit 20 (DEC0) to the picture reference control unit 101 of the decoding control unit'10, monitoring of the decoding process position of the first decoding processing unit 20 (DEC0) by the second decoding processing unit 21 (DEC1) is permitted. As described above, in the fifth period T4, in response to the frame decoding process end signal PEN0 and the picture reference control signal B0, use of the result of the decoding process by the first decoding processing unit 20 (DEC0) in the fifth period T4 as a reference picture for the inter-decoding process in the latter half of the fourth P frame P3 by the second decoding processing unit 21 (DEC1) is inhibited. In the fifth period T4, however, the result of the inter-decoding process in the latter half of the third P frame P2 by the first decoding processing unit 20 (DEC0) in the fourth period T3 can be used as a reference picture for the inter-decoding process in the latter half of the fourth P frame P3 by the second decoding processing unit 21 (DEC1).

Therefore, in the moving-picture decoding processing apparatus according to the first embodiment illustrated in FIGS. 1 and 2, in the fifth period T4, the first decoding processing unit (DEC0) does not have to execute the no-operation (NOP) instruction and can execute the inter-decoding process of the first half of the fifth P frame P4 which is not illustrated in FIG. 2. Consequently, deterioration in the parallel processing capability as described with reference to FIG. 7 can be lessened.

Further, reach of the decoding process of the fourth P frame P3 by the second decoding processing unit 21 (DEC1) from the start point (0, 0) to the intermediate point (X/2, Y/2) is detected by a change from the low level "0" to the high level "1" of the process block signal PMB1 supplied from the filter unit 218 of the second decoding processing unit 21 (DEC1) to the process block control unit 102 of the decoding control unit 10. In response to the detection result by the process block signal PMB1, the decoding process in the first half of the fifth P frame P4 which is not illustrated in FIG. 2 is started by the first decoding processing unit 20 (DEC0) from the start point (0, 0).

Specifically, in response to the change from the low level "0" to the high level "1" of the process block signal PMB1, in the fifth period T4, the first decoding processing unit 20 (DEC0) starts the process of decoding the coded information at the start point (0, 0) of the fifth P frame P4 which is not illustrated in FIG. 2. Concretely, the block process start signal Start_MB0 is supplied from the process block control unit 102 of the decoding control unit 10 to the variable-length decoding unit 201 of the first decoding processing unit 20 (DEC0), and a serial number of the macro block (MB) or the largest coding unit (LCU) from which the decoding process is started is instructed by the block process start signal Start_MB0. As the process block control unit 102 of the decoding control unit 10 increments the value of the block process start signal Start_MB0, the first decoding processing unit 20 (DEC0) makes progress on the decoding process of coded information from the start point (0, 0) of the fifth P frame P4 which is not illustrated in FIG. 2 toward the intermediate point (X/2, Y/2). In the fifth period T4 since the first decoding processing unit 20 (DEC0) starts the process of decoding the coded information at the start point (0, 0) of the fifth P frame P4 until it starts the process of decoding the coded information at the intermediate point (X/2, Y/2) of the fifth P frame P4, the parallel decoding process such that the first decoding processing unit 20 (DEC0) and the second decoding processing unit 21 (DEC1) execute the decoding process is executed. As reference picture information for the inter-decoding process in the first-half part of the fifth P frame P4 by the first decoding processing unit 20 (DEC0) in the parallel decoding process in the fifth period T4, a result of the inter-decoding process in the first-half part of the fourth P frame P3 by the second decoding processing unit 21 (DEC1) in the fourth period T3 is used by the second decoding processing unit 21 (DEC1).

Therefore, the first decoding processing unit 20 (DEC0) generates, in the fourth period T3, the reference data address signal Add_Ref_Pict for accessing the result of the intra-decoding process in the first-half part of the fourth P frame P3 by the second decoding processing unit 21 (DEC1) in the fourth period T3 as the reference picture information for the inter-decoding process in the first-half part of the fifth P frame P4. That is, the reference data address signal Add_Ref_Pict for accessing the result of the inter-decoding process in the first-half part of the P frame P3 by the second decoding processing unit 21 (DEC1) in the fourth period T3 is supplied from the variable-length decoding unit 201 of the first decoding processing unit 20 (DEC0) to the frame memory 40 via the memory control unit 30 in the fifth period T4.

Although not illustrated in FIG. 2, in the sixth period T5, a parallel decoding process such that the inter-decoding process in the latter-half part of the fifth P frame P4 by the first decoding processing unit 20 (DEC0) and the inter-decoding process in the first-first part of the sixth P frame P5 by the second decoding processing unit 21 (DEC1) are executed is executed. Hereinafter, similarly, the above-described parallel decoding process can be executed repeatedly.

Second Embodiment

Configuration of Moving-Picture Coding Processing Apparatus

FIG. 3 is a diagram illustrating the configuration of a moving-picture coding processing apparatus according to a second embodiment.

A moving-picture decoding processing apparatus of the second embodiment illustrated in FIG. 3 has the decoding control unit 10, a first decoding processing unit 50 (ENC0), a second decoding processing unit 51 (ENC1), the memory control unit 30, the frame memory 40, stream buffers 60 and 70, and a stream synthesizing unit 80.

Since the video input signal VS to be processed is supplied to the memory control unit 30 as illustrated in FIG. 3, the memory control unit 30 stores the first and third frames as odd-numbered frames and the second and fourth frames as even-numbered frames in the video input signal VS into the frame memory 40.

The first and third frames as odd-numbered frames stored in the frame memory 40 and, after that, read by the memory control unit 30 are subjected to the coding process by the first coding processing unit 50 (ENC0), and the second and fourth frames as even-numbered frames stored in the frame memory 40 and read by the memory control unit 30 are subjected to a coding process by the second coding processing unit 51 (ENC1). As a result, the moving-picture coding processing apparatus of the second embodiment illustrated in FIG. 3 can, reduce the hardware for executing the parallel coding process.

The first frame read by the memory control unit 30 is intra-coded by the first coding processing unit 50 (ENC0) without referring, to other pictures and the second frame to be read next is inter-coded by the second coding processing unit 51 (ENC1) by referring to the result of the coding process of the first I frame I0. The third frame to be read next is inter-coded by the first coding processing unit 50 (ENC0) by referring to the result of the coding process of the second P frame P1, and the fourth frame to be read next is inter-coded by the second coding processing unit 51 (ENC1) by referring to the result of the coding process of the third P frame P2.

The first I frame as an odd-numbered frame includes coded information at each of the start point (0, 0), the intermediate point (X/2, Y/2), and the end point (X, Y) of a raster scan on a moving-picture coding screen which is set in the pixel size of high definition (HD). Specifically, the moving-picture coding screen which is set in the pixel size of high definition (HD) has X pieces of pixels in the horizontal direction and Y pieces of pixels in the vertical direction. Each of the second P frame P1 as an even-numbered frame, the third P frame P2 as an odd-numbered frame, and the fourth P frame P3 as an even-numbered frame includes coded information at the start point (0, 0), the intermediate point (X/2, Y/2), and the end point (X, Y) of the raster scan on the moving-picture coding screen which is set in the pixel size of high definition (HD).

Coding Control Unit

The coding control unit 10 executes coding control for performing the coding process on a plurality of frames stored in the frame memory 40 in conformity to the H.264/AVC standard or H.265/HEVC standard. That is, the decoding control unit 10 determines either the intra-coding or inter-coding to code each of the plural frames stored in the frame memory 40, and executes the timing control of the coding process of each of the frames. As a result, the process of coding the first I frame I0 by the first coding processing unit 50 (ENC0) and the process of coding the second P frame P1 by the second coding processing unit 51 (ENC1) become a pipeline operation having the time difference which is about the half of the pixel size of high definition (HD).

Therefore, by the pipeline operation having the time difference which is about the half of the pixel size of h-definition HD, the result of the intra-coding process of the first-half part of the first I frame I0 by the first coding processing unit 50 (ENC0) in the first period can be used as reference picture information for the inter-coding process in the first-half part of the second P frame P1 by the second coding processing unit 51 (ENC1) in the second period. Further, the result of the intra-coding process of the latter-half part of the first I frame I0 by the first coding processing unit 50 (ENC0) in the second period can be used as reference picture information for the inter-coding process in the latter-half part of the second P frame P1 by the second coding processing unit 51 (ENC1) in the third period.

Further, the decoding control unit 10 includes the picture reference control unit 101 and the process block control unit 102. The frame decoding process end signals PEN0 and PEN1 are supplied from the first and second coding processing units 50 (ENC0) and 51 (ENC1) to the picture reference control unit 101, and the picture reference control signals B0 and B1 are supplied from the picture reference control unit 101 to the process block control unit 102. Picture process start signals Start_Pix0 and Start_Pix1 are supplied from the process block control unit 102 to the first and second coding processing units 50 (ENC0) and 51 (ENC1), and the process block signals PMB0 and PMB1 are supplied from the first and second coding processing units 50 (ENC0) and 51 (ENC1) to the process block control unit 102.

First and Second Coding Processing Units

The first coding processing unit 50 (ENC0) includes a picture supply switch 5001, a subtracter 5002, a frequency transforming unit 5003, a quantizing unit 5004, an inverse quantizing unit 5005, an inverse frequency transforming unit 5006, and an adder 5007. Further, the first coding processing unit 50 (ENC0) includes a filter unit 5008, a motion vector detecting unit 5009, a motion compensating unit 5010, an intra-predicting unit 5011, a selector unit 5012, and a variable-length coding unit 5013.

Moving-picture signals configuring one macro block (MB) or one largest coding unit (LCU) are supplied from each of the first I frame I0 and the third P frame P2 as odd-numbered frames to one of the input terminals of the subtracter 5002 via the picture supply switch 5001 which is controlled to the on state by the picture process start signal Start_Pix0. At the same time, the moving-picture signal is supplied to one of the input terminals of the motion vector detecting unit 5009 and one of the input terminals of the intra-predicting unit 5011.

Although not illustrated in FIG. 3, a prediction mode indicative of the inter-prediction or intra-prediction of each of moving pictures is supplied from the coding control unit 10 to the selector unit 5012 and the variable-length coding unit 5013. The moving-picture signal to be inter-coded is stored in the frame memory 40 for coding of a P frame or B frame and detection of a motion vector, after that, read from the frame memory 40, and supplied to one of the input terminals of the subtracter 5002. The motion vector detecting unit 5009 generates a motion vector MV in response to the moving-picture signal read from the frame memory 40 and the reference picture stored in the frame memory 40. The motion compensating unit 5010 generates a motion compensation prediction signal in response to the motion vector MV generated from the motion vector detecting unit 5009 and the reference picture stored in the frame memory 40. The motion compensation prediction signal from the motion compensating unit 5010 is subtracted from the moving-picture signal by the subtracter 5002 via the selector unit 5012, and a frequency converting process and a quantizing process are executed on a prediction residual signal as a subtraction output signal of the subtracter 5002 in the frequency transforming unit 5003 and the quantizing unit 5004, respectively. A frequency transform coefficient quantized by the quantizing unit 5004 and the motion vector MV generated from the motion vector detecting unit 5009 are subjected to a variable-length coding process in the variable-length coding unit 5013, and a coded bit stream BS is generated via the stream buffer 60 and the stream synthesizing unit 80. The frequency transform coefficient quantized by the quantizing unit 5004 is subjected to a local decoding process executed by the inverse quantizing unit 5005, the inverse frequency transforming unit 5006, the adder 5007, and the filter unit 5008, and a result of the local decoding process is stored as a reference picture into the frame memory 40. The filter unit 5008 has the function of a deblocking filter for reducing a block distortion in conformity to the H.264/AVC standard. In addition to the deblocking filter function, to be conformed to the H.265/HEVC standard, the filter unit 5008 also has a filter function called the sample adaptive offset (SAO). The filter function of the sample adaptive offset (SAO) is to preferably reconstruct the original signal amplitude by using a lookup table written with an additional parameter determined by frequency distribution analysis of a not-illustrated coding control unit in the moving-picture coding apparatus of FIG. 3.

A moving-picture signal to be intra-coded is stored in the frame memory 40 and, after that, the moving-picture signal read from the frame memory 40 is supplied to one of the input terminals of the intra-predicting unit 5011. On the other hand, the reference picture coded by the intra-prediction and generated by the local decoding process is generated at the output terminal of the adder 5007, and the reference picture generated from the output terminal of the adder 5007 is supplied to the other input terminal of the intra-predicting unit 5011. Therefore, at the time of intra-coding the moving-picture signal supplied to the one of the input terminals, the intra-predicting unit 5011 selects an optimum picture signal from a plurality of adjacent picture signals included in a coded reference picture supplied from the output terminal of the adder 5007 to the other input terminal and further generates spatial information of the selected optimum picture signal. As a result, the intra-predicting unit 5011 supplies intra-prediction information including the intra-predicted optimum picture signal and the corresponding spatial prediction mode to the selector unit 5012.

The second coding processing unit 51 (ENC1) includes a picture supply switch 5101, a subtracter 5102, a frequency transforming unit 5103, a quantizing unit 5104, an inverse quantizing unit 5105, an inverse frequency transforming unit 5106, and an adder 5107. Further, the second coding processing unit 51 (ENC1) includes a filter unit 5108, a motion vector detecting unit 5109, a motion compensating unit 5110, an intra-predicting unit 5111, a selector unit 5112, and a variable-length coding unit 5113.

Moving-picture signals configuring one macro block (MB) or one largest coding unit (LCU) are supplied from each of the second P frame P1 and the fourth P frame P3 as even-numbered frames to one of the input terminals of the subtracter 5102 via the picture supply switch 5101 which is controlled to the on state by the picture process start signal Start_Pix1. At the same time, the moving-picture signal is supplied to one of the input terminals of the motion vector detecting unit 5109 and one of the input terminals of the intra-predicting unit 5111.

Since the subtracter 5102, the frequency transforming unit 5103, the quantizing unit 5104, the inverse quantizing unit 5105, the inverse frequency transforming unit 5106, the adder 5107, the filter unit 5108, the motion vector detecting unit 5109, the motion compensating unit 5110, the intra-predicting unit 5111, the selector unit 5112, and the variable-length coding unit 5113 operate in a manner similar to those of the first coding processing unit 500, the description of the operation will not be repeated.

Use of Semiconductor Integrated Circuit

A most part of the moving-picture coding processing apparatus according to the second embodiment illustrated in FIG. 3 is integrated in the semiconductor chip of a system LSI semiconductor integrated circuit called a system on chip (SoC). The frame memory 40, however, is integrated in the semiconductor chip of a synchronous static random access memory (SRAM) configured separately from the system LSI semiconductor integrated circuit. Therefore, the coding control unit 10, the first coding processing unit 50 (ENC0), the second coding processing unit 51 (ENC1), the memory control unit 30, the stream buffers 60 and 70, and the stream synthesizing unit 80 are integrated in the semiconductor chip of a system on chip (SoC).

Operation of Moving-Picture Coding Processing Apparatus

FIG. 4 is a diagram explaining the operation of the moving-picture coding processing apparatus according to the second embodiment illustrated in FIG. 3.

Single Coding Process in First Period

Since the first and third frames as odd-numbered frames read from the frame memory 40 by the memory control unit 30 are subjected to a coding process by the first coding processing unit 50 (ENC0), and the second and fourth frames as even-numbered frames stored in the frame memory 40 and, after that, read by the memory control unit 30 are subjected to a coding process by the second coding processing unit 51 (ENC1).

Specifically, the moving-picture signal of the first I frame I0 as an odd-numbered frame is supplied to the first coding processing unit 50 (ENC0) and, in the first period T0, the first coding processing unit 50 (ENC0) starts the process of coding the moving picture at the start point (0, 0) of the first I frame I0. Concretely, the picture process start signal Start_Pix0 is supplied from the process block control unit 102 of the coding control unit 10 to the picture supply switch 5001 of the first coding processing unit 50 (ENC0), and serial numbers of moving-picture signals configuring one macro block (MB) or largest coding unit (LCU) on which the coding process is started by the picture process start signal Start_Pix0 are instructed. As the process block control unit 102 of the coding control unit 10 increments the value of the picture process start signal Start_Pix0, the first coding processing unit 50 (ENC0) makes progress on the coding process of the moving picture signal from the start point (0, 0) of the first I frame I0 toward the intermediate point (X/2, Y/2). In the first period T0 since the first coding processing unit 50 starts the process of coding the moving picture signal at the start point (0, 0) of the first I frame I0 until it starts the process of coding the moving picture signal at the intermediate point (X/2, Y/2) of the first I frame I0, a single decoding process such that only the first coding processing unit 50 executes the coding process and the second coding processing unit 51 stops the coding process is executed.

Parallel Coding Process in Second Period

In the second period T1 since the first coding processing unit 50 (ENC0) starts the process of coding the moving picture signal at the intermediate point (X/2, Y/2) of the first I frame I0 until it ends the process of coding the moving picture signal at the end point (X, Y) of the first I frame I0, a parallel coding process such that the first coding processing unit 50 (ENC0) and the second coding processing unit 51 (ENC1) execute the coding process is executed. Specifically, reach of the process of coding the first I frame I0 started from the start point (0, 0) to the intermediate point (X/2, Y/2) by the first coding processing unit 50 (ENC0) is detected by a change from the low level "0" to the high level "1" of the process block signal PMB0 supplied from the filter unit 5008 of the first decoding processing unit 50 (ENC0) to the process block control unit 102 of the coding control unit 10. In response to the detection result by the process block signal PMB0, the coding process in the first half of the second P frame P1 by the second coding processing unit 51 (ENC1) is started from the start point (0, 0).

Specifically, in response to the change from the low level "0" to the high level "1" of the process block signal PMB0, in the second period T1, the second coding processing unit 51 (ENC1) starts the process of coding the moving picture signal at the start point (0, 0) of the second P frame P1. Concretely, the picture process start signal Start_Pix1 is supplied from the process block control unit 102 of the coding control unit 10 to the picture supply switch 5101 of the second coding processing unit 51 (ENC1), and serial numbers of moving picture signals configuring one macro block (MB) or largest coding unit (LCU) on which the coding process is started by the picture process start signal Start_Pix1 are instructed. As the process block control unit 102 of the coding control unit 10 increments the value of the picture process start signal Start_Pix0, the second coding processing unit 51 (ENC1) makes progress on the coding process of the moving picture signal from the start point (0, 0) of the second P frame P1 toward the intermediate point (X/2, Y/2). In the second period T1 since the second coding processing unit 51 (ENC1) starts the process of coding the moving picture signal at the start point (0, 0) of the second P frame P1 until it starts the process of coding the moving picture signal at the intermediate point (X/2, Y/2) of the second P frame P1, the parallel coding process such that the first coding processing unit 50 (ENC0) and the second coding processing unit 51 (ENC1) execute the coding process is executed. As reference picture information for the inter-coding process in the first-half part of the second P frame P1 by the second coding processing unit 51 (ENC1) in the parallel coding process in the second period T1, a result of the intra-coding process in the first-half part of the first I frame I0 by the first coding processing unit 50 (ENC0) in the first period T0 is used by the second coding processing unit 51 (ENC1).

Therefore, the second coding processing unit 51 (ENC1) generates, in the second period T1, the reference data address signal for accessing the result of the intra-coding process in the first-half part of the first I frame I0 by the first coding processing unit 50 (ENC0) in the first period T0 as the reference picture information for the inter-coding process in the first-half part of the second P frame P1. That is, the reference data address signal for accessing the result of the intra-coding process in the first-half part of the I frame I0 by the first coding processing unit 50 (ENC0) in the first period T0 is supplied from the second coding processing unit 51 (ENC1) to the frame memory 40 via the memory control unit 30 in the second period T1.

Parallel Coding Process in Third Period

Also in the third period T2 since the second coding processing unit 51 (ENC1) starts the process of coding the moving picture signal at the intermediate point (X/2, Y/2) of the second P frame P1 until it ends the process of coding the moving picture signal at the end point (X, Y) of the second P frame P1, a parallel coding process such that the first coding processing unit 50 (ENC0) and the second coding processing unit 51 (ENC1) execute the coding process is executed. Particularly, at the final timing of the second period T1, the frame coding process end signal PEN0 indicating completion of the inter-coding process on the moving picture signals configuring one macro block or largest coding unit at the endpoint (X, Y) in the first I frame I0 by the first coding processing unit 50 is supplied from the filter unit 5108 of the first coding processing unit 50 to the picture reference control unit 101. Therefore, in response to the frame coding process end signal PEN0, a picture reference control signal B0 supplied from the picture reference control unit 101 to the process block control unit 102 changes from the high level "1" to the low level "0", so that monitoring of the coding process position of the first coding processing unit 50 (ENC0) by, the second coding processing unit 51 (ENC1) in the third period T2 is stopped. Since the picture reference control signal B0 is maintained at the high level "1" before the frame coding process end signal PEN0 is supplied from the filter unit 5108 of the first coding processing unit 50 (ENC0) to the picture reference control unit 101 of the coding control unit 10, monitoring of the coding process position of the first coding processing unit 50 (ENC0) by the second coding processing unit 51 (ENC1) is permitted. As described above, in the third period T2, in response to the frame coding process end signal PEN0 and the picture reference control signal B0, use of the result of the coding process by the first coding processing unit 50 (ENC0) in the third period T2 as a reference picture for the inter-coding process in the latter half of the second P frame P1 by the second coding processing unit 21 (DEC1) is inhibited. In the third period T2, however, the result of the intra-coding process in the latter half of the first I frame I0 by the first coding processing unit 50 (ENC0) in the second period T1 can be used as a reference picture for the inter-coding process in the latter half of the second P frame P1 by the second coding processing unit 51 (ENC1).

Therefore, in the moving-picture coding processing apparatus according to the second embodiment illustrated in FIGS. 3 and 4, in the third period T2, the first coding processing unit 50 (ENC0) does not have to execute the no-operation (NOP) instruction and can execute the inter-coding process of the first half of the third P frame P2. Consequently, deterioration in the parallel processing capability as described with reference to FIG. 7 can be lessened.

Further, reach of the coding process of the second P frame P1 by the second coding processing unit 51 (ENC1) started from the start point (0, 0) to the intermediate point (X/2, Y/2) is detected by a change from the low level "0" to the high level "1" of the process block signal PMB1 supplied from the filter unit 5018 of the second coding processing unit 51 (ENC1) to the process block control unit 102 of the coding control unit 10. In response to the detection result by the process block signal PMB1, the coding process in the first half of the third P frame P2 by the first coding processing unit 50 (ENC0) is started from the start point (0, 0).

Specifically, in response to the change from the low level "0" to the high level "1" of the process block signal PMB1, in the third period T2, the first coding processing unit 20 (ENC0) starts the process of coding the moving picture signal at the start point (0, 0) of the third P frame P2. Concretely, the picture process start signal Start_Pix0 is supplied from the process block control unit 102 of the coding control unit 10 to the picture supply switch 5001 of the first coding processing unit 50 (ENC0), and serial numbers configuring one macro block (MB) or largest coding unit (LCU) on which the coding process is started by the picture process start signal Start_Pix0 are instructed. As the process block control unit 102 of the coding control unit 10 increments the value of the picture process start signal Start_Pix0, the first coding processing unit 50 (ENC0) makes progress on the coding process of the moving picture signal from the start point (0, 0) of the third P frame P2 toward the intermediate point (X/2, Y/2). In the third period T2 since the first coding processing unit 50 (ENC0) starts the process of coding the moving picture signal at the start point (0, 0) of the third P frame P2 until it starts the process of coding the moving picture signal at the intermediate point (X/2, Y/2) of the third P frame P2, the parallel coding process such that the first coding processing unit 50 (ENC0) and the second coding processing unit 51 (ENC1) execute the coding process is executed. As reference picture information for the inter-coding process in the first-half part of the third P frame P2 by the first coding processing unit 50 (ENC0) in the parallel coding process in the third period T2, a result of the inter-coding process in the first-half part of the second P frame P1 by the second coding processing unit 51 (ENC1) in the second period T1 is used by the first coding processing unit 50 (ENC0).

Therefore, the first coding processing unit 50 (ENC0) generates, in the third period T2, the reference data address signal for accessing the result of the intra-coding process in the first-half part of the second P frame P1 by the second coding processing unit 51 (ENC1) in the second period T1 as the reference picture information for the inter-coding process in the first-half part of the third P frame P2. That is, the reference data address signal for accessing the result of the inter-coding process in the first-half part of the P frame P1 by the second coding processing unit 51 (ENC1) in the second period T1 is supplied from the first coding processing unit 50 (ENC0) to the frame memory 40 via the memory control unit 30 in the third period T2.

Parallel Coding Process in Fourth Period

Also in the fourth period T3 since the first coding processing unit 50 (ENC0) starts the process of coding the moving picture signal at the intermediate point (X/2, Y/2) of the third P frame P2 until it ends the process of coding the moving picture signal at the end point (X, Y) of the third P frame P2, a parallel decoding process such that the first coding processing unit 50 (ENC0) and the second coding processing unit 51 (ENC1) execute the coding process is executed. Particularly, the frame coding process end signal PEN1 indicating completion of the inter-coding process of the moving picture signals configuring one macro block or largest coding unit at the end point (X, Y) in the second P frame P1 by the second coding processing unit 51 at the final timing of the third period T2 is supplied from the filter unit 5018 of the second coding processing unit 51 to the picture reference control unit 101 of the coding control unit 10. Therefore, the picture reference control signal B1 supplied from the picture reference control unit 101 to the process block control unit 102 changes from the high level "1" to the low level "0" in response to the frame coding process end signal PEN1, so that monitoring of the coding process position of the second coding processing unit 51 (ENC1) by the first coding processing unit 50 (ENC0) in the fourth period T3 is stopped. Since the picture reference control signal B1 is maintained at the high level "1" before the frame coding process end signal PEN1 is supplied from the filter unit 5018 of the second coding processing unit 51 (ENC1) to the picture reference control unit 101 of the coding control unit 10, monitoring of the coding process position of the second coding processing unit 51 (ENC1) by the first coding processing unit 50 (ENC0) is permitted. As described above, in the fourth period T3, in response to the frame coding process end signal PEN1 and the picture reference control signal B1, use of the result of the coding process by the second coding processing unit 51 (ENC1) in the fourth period T3 as a reference picture for the inter-coding process in the latter half of the third P frame P2 by the first coding processing unit 50 (ENC0) is inhibited. In the fourth period T3, however, the result of the inter-coding process in the latter half of the second P frame P1 by the second coding processing unit 51 (ENC1) in the third period T2 can be used as a reference picture for the inter-coding process in the latter half of the third P frame P2 by the first coding processing unit 50 (ENC0).

Therefore, in the moving-picture coding processing apparatus according to the second embodiment illustrated in FIGS. 3 and 4, in the fourth period T3, the second coding processing unit 51 (ENC1) does not have to execute the no-operation (NOP) instruction and can execute the inter-coding process of the first half of the fourth P frame P3. Consequently, deterioration in the parallel processing capability as described with reference to FIG. 7 can be lessened.

Further, reach of the coding process of the third P frame P2 by the first coding processing unit 50 (ENC0) from the start point (0, 0) to the intermediate point (X/2, Y/2) is detected by a change from the low level "0" to the high level "1" of the process block signal PMB0 supplied from the filter unit 5008 of the first coding processing unit 50 (ENC0) to the process block control unit 102 of the coding control unit 10. In response to the detection result by the process block signal PMB0, the coding process in the first half of the fourth P frame P3 by the second coding processing unit 51 (ENC1) is started from the start point (0, 0).

Specifically, in response to the change from the low level "0" to the high level "1" of the process block signal PMB0, in the fourth period T3, the second coding processing unit 51 (ENC1) starts the process of coding the moving picture signal at the start point (0, 0) of the fourth P frame P3. Concretely, the picture process start signal Start_Pix1 is supplied from the process block control unit 102 of the coding control unit 10 to the picture supply switch 5101 of the second coding processing unit 51 (ENC1), and serial numbers configuring one macro block (MB) or largest coding unit (LCU) on which the coding process is started by the picture process start signal Start_Pix1 are instructed. As the process block control unit 102 of the coding control unit 10 increments the value of the picture process start signal Start_Pix1, the second coding processing unit 51 (ENC1) makes progress on the coding process of the moving picture signal from the start point (0, 0) of the fourth P frame P3 toward the intermediate point (X/2, Y/2). In the fourth period T3 since the second coding processing unit 51 (ENC1) starts the process of coding the moving picture signal at the start point (0, 0) of the fourth P frame P3 until it starts the process of coding the moving picture signal at the intermediate point (X/2, Y/2) of the fourth P frame P3, the parallel decoding process such that the first coding processing unit 50 (ENC0) and the second coding processing unit 51 (ENC1) execute the coding process is executed. As reference picture information for the inter-coding process in the first-half part of the fourth P frame P3 by the second coding processing unit 51 (ENC1) in the parallel coding process in the fourth period T3, a result of the inter-coding process in the first-half part of the third P frame P2 by the first coding processing unit 50 (ENC0) in the third period T2 is used by the second coding processing unit 51 (ENC1).

Therefore, the second coding processing unit 51 (ENC1) generates, in the fourth period T3, the reference data address signal for accessing the result of the intra-coding process in the first-half part of the third P frame P2 by the first coding processing unit 50 (ENC0) in the third period T2 as the reference picture information for the inter-coding process in the first-half part of the fourth P frame P3. That is, the reference data address signal for accessing the result of the inter-coding process in the first-half part of the P frame P2 by the first coding processing unit 50 (ENC0) in the third period T2 is supplied from the second coding processing unit 51 (ENC1) to the frame memory 40 via the memory control unit 30 in the fourth period T3.

Parallel Coding Process in Fifth Period

Also in the fifth period T4 since the second coding processing unit 51 (ENC1) starts the process of coding the moving picture signal at the intermediate point (X/2, Y/2) of the fourth P frame P3 until it ends the process of coding the moving picture signal at the end point (X, Y) of the fourth P frame P3, a parallel coding process such that the first coding processing unit 50 (ENC0) and the second coding processing unit 51 (ENC1) execute the coding process is executed. Specifically, the frame coding process end signal PEN0 indicating completion of the inter-coding process on the moving picture signals configuring one macro block or largest coding unit at the end point (X, Y) in the third P frame P2 by the first coding processing unit 50 at the final timing of the fourth period T3 is supplied from the filter unit 5108 of the first coding processing unit 50 to the picture reference control unit 101. Therefore, the picture reference control signal B0 supplied from the picture reference control unit 101 to the process block control unit 102 changes from the high level "1" to the low level "0" in response to the frame coding process end signal PEN0, so that monitoring of the coding process position of the first coding processing unit 50 (ENC0) by the second coding processing unit 51 (ENC1) in the fifth period T4 is stopped. Since the picture reference control signal B0 is maintained at the high level "1" before the frame coding process end signal PEN0 is supplied from the filter unit 5108 of the first coding processing unit 50 (ENC0) to the picture reference control unit 101 of the coding control unit 10, monitoring of the coding process position of the first coding processing unit 50 (ENC0) by the second coding processing unit 51 (ENC1) is permitted. As described above, in the fifth period T4, in response to the frame coding process end signal PEN0 and the picture reference control signal B0, use of the result of the coding process by the first coding processing unit 50 (ENC0) in the fifth period T4 as a reference picture for the inter-coding process in the latter half of the fourth P frame P3 by the second coding processing unit 51 (ENC1) is inhibited. In the fifth period T4, however, the result of the inter-coding process in the latter half of the third P frame P2 by the first coding processing unit 50 (ENC0) in the fourth period T3 can be used as a reference picture for the inter-coding process in the latter half of the fourth P frame P3 by the second coding processing unit 51 (ENC1).

Therefore, in the moving-picture coding processing apparatus according to the second embodiment illustrated in FIGS. 3 and 4, in the fifth period T4, the first coding processing unit 50 (ENC0) does not have to execute the no-operation (NOP) instruction and can execute the inter-coding process of the first half of the fifth P frame P4 which is not illustrated in FIG. 4. Consequently, deterioration in the parallel processing capability as described with reference to FIG. 7 can be lessened.

Further, reach of the coding process of the fourth P frame P3 by the second coding processing unit 51 (ENC1) from the start point (0, 0) to the intermediate point (X/2, Y/2) is detected by a change from the low level "0" to the high level "1" of the process block signal PMB1 supplied from the filter unit 5018 of the second coding processing unit 51 (ENC1) to the process block control unit 102 of the coding control unit 10. In response to the detection result by the process block signal PMB1, the coding process in the first half of the fifth P frame P4 which is not illustrated in FIG. 4 is started by the first coding processing unit 50 (ENC0) from the start point (0, 0).

Specifically, in response to the change from the low level "0" to the high level "1" of the process block signal PMB1, in the fifth period T4, the first coding processing unit 50 (ENC0) starts the process of coding the moving picture signal at the start point (0, 0) of the fifth P frame P4 which is not illustrated in FIG. 4. Concretely, the picture process start signal Start_Pix0 is supplied from the process block control unit 102 of the coding control unit 10 to the picture supply switch 5001 of the first coding processing unit 50 (ENC0), and serial numbers of moving picture signals configuring one macro block (MB) or largest coding unit (LCU) on which the coding process is started by the picture process start signal Start_Pix0 are instructed. As the process block control unit 102 of the coding control unit 10 increments the value of the picture process start signal Start_Pix0, the first coding processing unit 50 (ENC0) makes progress on the coding process of the moving picture signal from the start point (0, 0) of the fifth P frame P4 which is not illustrated in FIG. 4 toward the intermediate point (X/2, Y/2). In the fifth period T4 since the first coding processing unit 50 (ENC0) starts the process of coding the moving picture signal at the start point (0, 0) of the fifth P frame P4 until it starts the process of coding the moving picture signal at the intermediate point (X/2, Y/2) of the fifth P frame P4, the parallel coding process such that the first coding processing unit 50 (ENC0) and the second coding processing unit 51 (ENC1) execute the coding process is executed. As reference picture information for the inter-coding process in the first-half part of the fifth P frame P4 by the first coding processing unit 50 (ENC0) in the parallel coding process in the fifth period T4, a result of the inter-coding process in the first-half part of the fourth P frame P3 by the second coding processing unit 51 (ENC1) in the fourth period T3 is used by the second coding processing unit 51 (ENC1).

Therefore, the first coding processing unit 50 (ENC0) generates, in the fourth period T3, the reference data address signal for accessing the result of the intra-coding process in the first-half part of the fourth P frame P3 by the second coding processing unit 51 (ENC1) in the fourth period T3 as the reference picture information for the inter-coding process in the first-half part of the fifth P frame P4. That is, the reference data address signal for accessing the result of the inter-coding process in the first-half part of the P frame P3 by the second coding processing unit 51 (ENC1) in the fourth period T3 is supplied from the first coding processing unit 50 (ENC0) to the frame memory 40 via the memory control unit 30 in the fifth period T4.

Although not illustrated in FIG. 4, in the sixth period T5, a parallel coding process such that the inter-coding process in the latter-half part of the fifth P frame P4 by the first coding processing unit 50 (ENC0) and the inter-coding process in the first-first part of the sixth P frame P5 by the second coding processing unit 51 (ENC1) are executed is executed. Hereinafter, similarly, the above-described parallel coding process can be executed repeatedly.

Although the invention achieved by the inventors herein has been described above on the basis of the various embodiments, obviously, the invention is not limited to the embodiments but can be variously modified without departing from the gist.

For example, the image decoding processing apparatus is not limited to have only two decoding processing units of the first decoding processing unit 20 (DEC0) and the second decoding processing unit 21 (DEC1).

Figure 5:
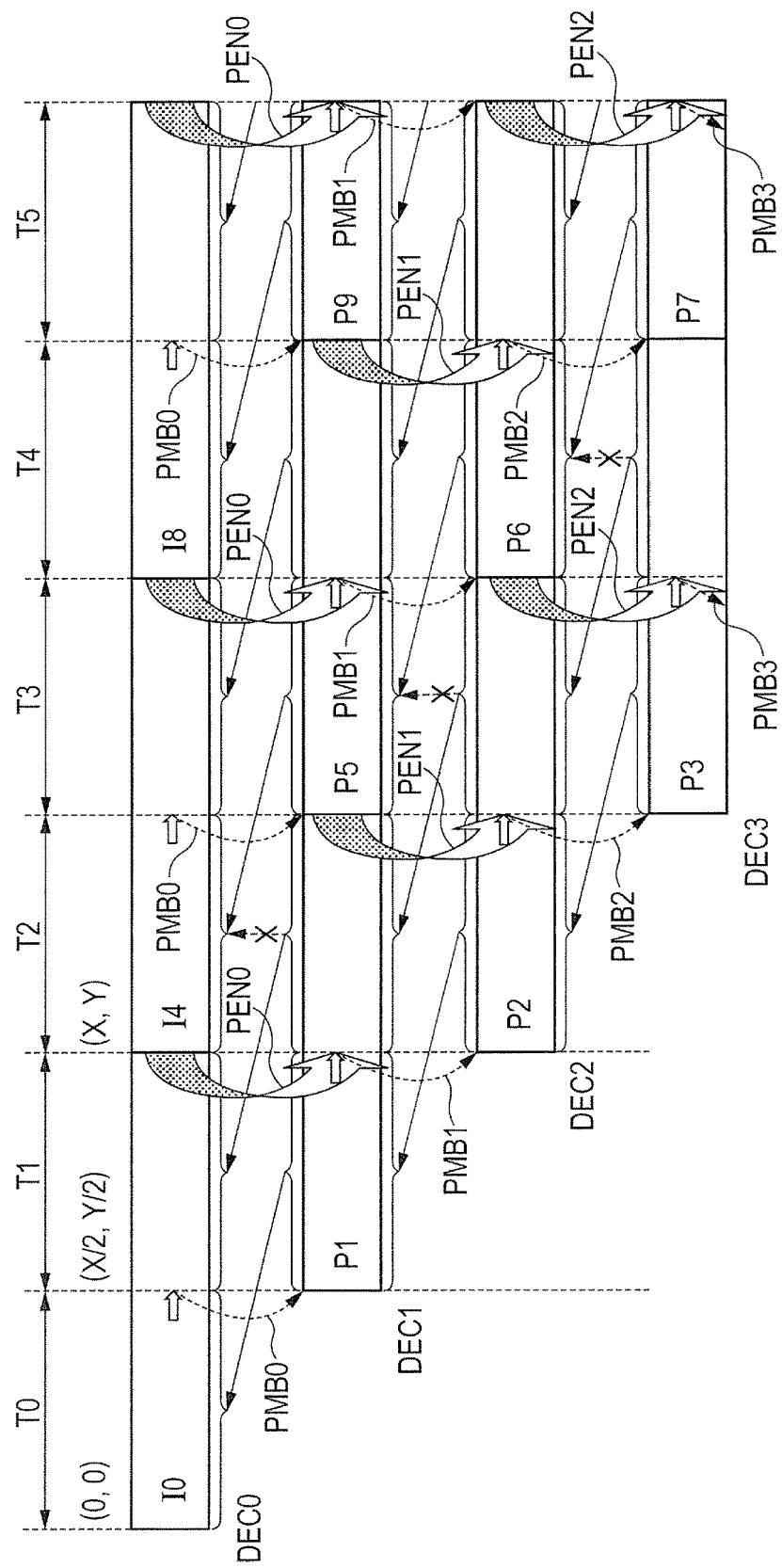
FIG. 5 is a diagram illustrating the configuration and operation of a moving-picture decoding processing apparatus according to another embodiment of the present invention.

FIG. 5 is a diagram illustrating the configuration and operation of a moving-picture decoding processing apparatus according to another embodiment of the present invention. Specifically, the moving-picture decoding processing apparatus according to another embodiment of the present invention illustrated in FIG. 5 has the first decoding processing unit DEC0, the second decoding processing unit DEC1, a third decoding processing unit DEC2, and a fourth decoding processing unit DEC3.

As illustrated in FIG. 5, the first I frame I0, a fifth I frame I4, and a ninth I frame I8 are intra-decoded by the first decoding processing unit DEC0. Each of the first I frame I0, the fifth I frame I4, and the ninth I frame I8 includes coded information at each of the start point (0, 0), the intermediate point (X/2, Y/2), and the endpoint (X, Y) of a raster scan of a moving-picture coding screen which is set in the pixel size of high definition (HD).

The second P frame P1, a sixth P frame P5, and a tenth P frame P9 are inter-decoded by the second decoding processing unit DEC1. Each of the second P frame P1, the sixth P frame P5, and the tenth P frame P9 includes coded information at each of the start point (0, 0), the intermediate point (X/2, Y/2), and the end point (X, Y) of the raster scan of the moving-picture coding screen which is set in the pixel size of high definition (HD).

The third P frame P2 and the seventh P frame P6 are inter-decoded by the third decoding processing unit DEC2. Each of the third P frame P2 and the seventh P frame P6 includes coded information at each of the start point (0, 0), the intermediate point (X/2, Y/2), and the end point (X, Y) of a raster scan of a moving-picture coding screen which is set in the pixel size of high definition (HD).

The fourth P frame P3 and the eighth P frame P7 are inter-decoded by the fourth decoding processing unit DEC3. Each of the fourth P frame P3 and the eighth P frame P7 includes coded information at each of the start point (0, 0), the intermediate point (X/2, Y/2), and the end point (X, Y) of a raster scan of a moving-picture coding screen which is set in the pixel size of high definition (HD).

In the moving-picture decoding processing apparatus illustrated in FIG. 5, in response to the frame decoding process end signal PEN0 generated from the first decoding processing unit DEC0 in the third period T2, use of the result of the intra-decoding process in the first half of the fifth I frame I4 by the first decoding processing unit DEC0 in the third period T2 as a reference picture for the inter-decoding process in the latter half of the second P frame P1 by the second decoding processing unit DEC1 is inhibited. In the third period T2, however, the result of the intra-decoding process in the latter half of the first I frame I0 by the first decoding processing unit DEC0 in the second period T1 can be used as a reference picture for the inter-decoding process in the latter half of the second P frame P1 by the second decoding processing unit DEC1.

In the moving-picture decoding processing apparatus illustrated in FIG. 5, in response to the frame decoding process end signal PENT generated from the second decoding processing unit DEC1 in the fourth period T3, use of the result of the inter-decoding process in the first half of the sixth P frame P5 by the second decoding processing unit DEC1 in the fourth period T3 as a reference picture for the inter-decoding process in the latter half of the third P frame P2 by the third decoding processing unit DEC2 is inhibited. In the fourth period T3, however, the result of the inter-decoding process in the latter half of the second P frame P1 by the second decoding processing unit DEC1 in the third period T2 can be used as a reference picture for the inter-decoding process in the latter half of the third P frame P2 by the third decoding processing unit DEC2.

In the moving-picture decoding processing apparatus illustrated in FIG. 5, in response to the frame decoding process end signal PEN0 generated from the first decoding processing unit DEC0 in the fifth period T4, use of the result of the intra-decoding process in the first half of the ninth I frame I8 by the first decoding processing unit DEC0 in the fifth period T4 as a reference picture for the inter-decoding process in the latter half of the sixth P frame P5 by the second decoding processing unit DEC1 is inhibited. In the fifth period T4, however, the result of the intra-decoding process in the latter half of the fifth I frame I4 by the first decoding processing unit DEC0 in the fourth period T3 can be used as a reference picture for the inter-decoding process in the latter half of the sixth P frame P5 by the second decoding processing unit DEC1. Further, in response to the frame decoding process end signal PEN2 generated from the third decoding processing unit DEC2 in the fifth period T4, use of the result of the inter-decoding process in the first half of the seventh P frame P6 by the third decoding processing unit DEC2 in the fifth period T4 as a reference picture for the inter-decoding process in the latter half of the fourth P frame P3 by the fourth decoding processing unit DEC3 is inhibited. In the fifth period T4, however, the result of the inter-decoding process in the latter half of the third P frame P2 by the third decoding processing unit DEC2 in the fourth period T3 can be used as a reference picture for the inter-decoding process in the latter half of the fourth P frame P3 by fourth decoding processing unit DEC3.

In the moving-picture decoding processing apparatus illustrated in FIG. 5, in response to the frame decoding process end signal PEN1 generated from the second decoding processing unit DEC1 in the sixth period T5, use of the result of the inter-decoding process in the first half of the tenth P frame P9 by the second decoding processing unit DEC1 in the sixth period T5 as a reference picture for the inter-decoding process in the latter half of the seventh P frame P6 by the second decoding processing unit DEC1 is inhibited. In the sixth period T5, however, the result of the inter-decoding process in the latter half of the sixth P frame P5 by the second decoding processing unit DEC1 in the fifth period T4 can be used as a reference picture for the inter-decoding process in the latter half of the seventh P frame P6 by the third decoding processing unit DEC2.

Therefore, the moving-picture decoding processing apparatus according to another embodiment illustrated in FIG. 5 does not have to execute the no-operation (NOP) instruction, so that deterioration in the parallel processing capability as described with reference to FIG. 7 can be lessened.

Further, the moving-picture coding processing apparatus is not limited to have only two coding processing units of the first coding processing unit 50 (ENC0) and the second coding processing unit 51 (ENC1).

Figure 6:
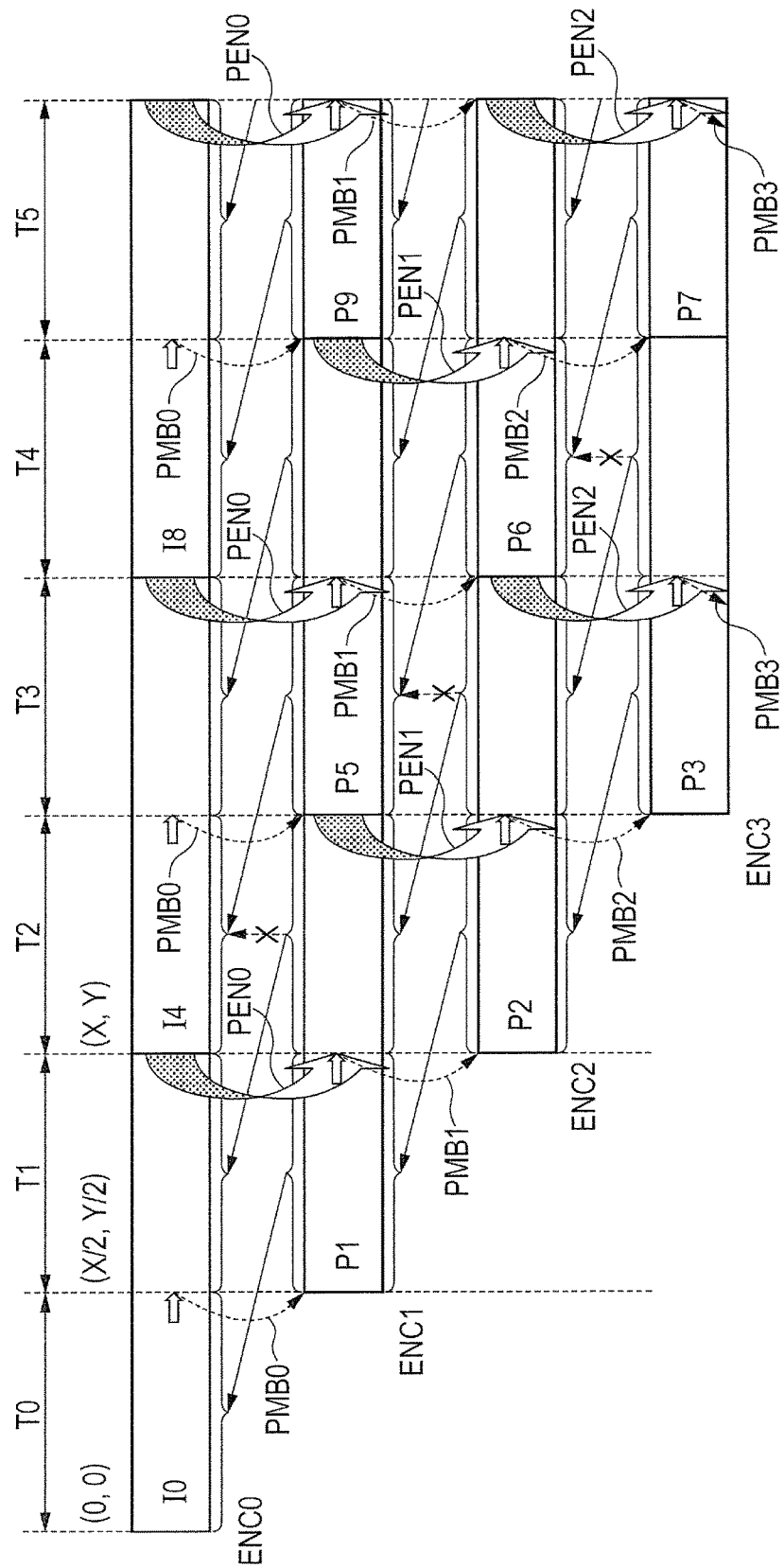
FIG. 6 is a diagram illustrating the configuration and operation of a moving-picture coding processing apparatus according to another embodiment of the present invention.

FIG. 6 is a diagram illustrating the configuration and operation of a moving-picture coding processing apparatus according to another embodiment of the present invention. Specifically, the moving-picture coding processing apparatus according to another embodiment of the present invention illustrated in FIG. 6 has the first coding processing unit ENC0, the second coding processing unit ENC1, the third coding processing unit ENC2, and the fourth coding processing unit ENC3.

As illustrated in FIG. 6, the first I frame I0, the fifth I frame I4, and the ninth I frame I8 are intra-coded by the first coding processing unit ENC0. Each of the first I frame I0, the fifth I frame I4, and the ninth I frame I8 includes coded information at each of the start point (0, 0), the intermediate point (X/2, Y/2), and the end point (X, Y) of a raster scan of a moving-picture coding screen which is set in the pixel size of high definition (HD).

The second P frame P1, the sixth P frame P5, and the tenth P frame P9 are inter-coded by the second coding processing unit ENC1. Each of the second P frame P1, the sixth P frame P5, and the tenth P frame P9 includes coded information at each of the start point (0, 0), the intermediate point (X/2, Y/2), and the end point (X, Y) of the raster scan of the moving-picture coding screen which is set in the pixel size of high definition (HD).

The third P frame P2 and the seventh P frame P6 are inter-coded by the third coding processing unit ENC2. Each of the third P frame P2 and the seventh P frame P6 includes coded information at each of the start point (0, 0), the intermediate point (X/2, Y/2), and the end point (X, Y) of a raster scan of a moving-picture coding screen which is set in the pixel size of high definition (HD).

The fourth P frame P3 and the eighth P frame P7 are inter-coded by the fourth coding processing unit ENC3. Each of the fourth P frame P3 and the eighth P frame P7 includes coded information at each of the start point (0, 0), the intermediate point (X/2, Y/2), and the endpoint (X, Y) of a raster scan of a moving-picture coding screen which is set in the pixel size of high definition (HD).

In the apparatus illustrated in FIG. 6, in response to the frame coding process end signal PEN0 generated from the first coding processing unit ENC0 in the third period T2, use of the result of the intra-coding process in the first half of the fifth I frame I4 by the first coding processing unit ENC0 in the third period T2 as a reference picture for the inter-coding process in the latter half of the second P frame P1 by the second coding processing unit ENC1 is inhibited. In the third period T2, however, the result of the intra-coding process in the latter half of the first I frame I0 by the first coding processing unit ENC0 in the second period T1 can be used as a reference picture for the inter-coding process in the latter half of the second P frame P1 by the second coding processing unit ENC1.

In the apparatus illustrated in FIG. 6, in response to the frame coding process end signal PEN1 generated from the second coding processing unit ENC1 in the fourth period T3, use of the result of the inter-coding process in the first half of the sixth P frame P5 by the second coding processing unit ENC1 in the fourth period T3 as a reference picture for the inter-coding process in the latter half of the third P frame P2 by the third coding processing unit ENC2 is inhibited. In the fourth period T3, however, the result of the inter-coding process in the latter half of the second P frame P1 by the second coding processing unit ENC1 in the third period T2 can be used as a reference picture for the inter-coding process in the latter half of the third P frame P2 by the third coding processing unit ENC2.

In the apparatus illustrated in FIG. 6, in response to the frame coding process end signal PEN0 generated from the first coding processing unit ENC0 in the fifth period T4, use of the result of the intra-coding process in the first half of the ninth I frame I8 by the first coding processing unit ENC0 in the fifth period T4 as a reference picture for the inter-coding process in the latter half of the sixth P frame P5 by the second coding processing unit ENC1 is inhibited. In the fifth period T4, however, the result of the intra-coding process in the latter half of the fifth I frame I4 by the first coding processing unit ENC0 in the fourth period T3 can be used as a reference picture for the inter-coding process in the latter half of the sixth P frame P5 by the second coding processing unit ENC1. Further, in response to the frame coding process end signal PEN2 generated from the third coding processing unit ENC2 in the fifth period T4, use of the result of the inter-coding process in the first half of the seventh P frame P6 by the third coding processing unit ENC2 in the fifth period T4 as a reference picture for the inter-coding process in the latter half of the fourth P frame P3 by the fourth coding processing unit ENC3 is inhibited. In the fifth period T4, however, the result of the inter-coding process in the latter half of the third P frame P2 by the third coding processing unit ENC2 in the fourth period T3 can be used as a reference picture for the inter-coding process in the latter half of the fourth P frame P3 by fourth coding processing unit ENC3.

In the apparatus illustrated in FIG. 6, in response to the frame coding process end signal PEN1 generated from the second coding processing unit ENC 1 in the sixth period T5, use of the result of the inter-coding process in the first half of the tenth P frame P9 by the second coding processing unit ENC1 in the sixth period T5 as a reference picture for the inter-coding process in the latter half of the seventh P frame P6 by the third coding processing unit ENC2 is inhibited. In the sixth period T5, however, the result of the inter-coding process in the latter half of the sixth P frame P5 by the second coding processing unit ENC1 in the fifth period T4 can be used as a reference picture for the inter-coding process in the latter half of the seventh P frame P6 by the third coding processing unit ENC2.

Therefore, the moving-picture coding processing apparatus according to another embodiment illustrated in FIG. 6 does not have to execute the no-operation (NOP) instruction, so that deterioration in the parallel processing capability as described with reference to FIG. 7 can be lessened.

Further, the moving-picture decoding processing apparatus or the moving-picture coding processing apparatus is not limited to only decode the coded bit stream conformed to the H.264/AVC standard or the H.265/HEVC standard.

Further, the moving-picture decoding processing apparatus can be applied to decode the coded bit stream BS conformed to a standard, which appears in future, using the largest coding unit (LCU) having a maximum size larger than 64×64 pixels as a process unit in addition to the H.265/HEVC standard using the largest coding unit (LCU) having a maximum size of 64×64 pixels as a process unit.

Further, the moving-picture coding processing apparatus can also decode the coded bit stream BS which is coded in conformity to the H.265/HEVC standard using the largest coding unit (LCU) having a size smaller than the maximum size of 64×64 pixels, for example, a size of 32×32 pixels as a process unit.

Further, the moving-picture coding processing apparatus can also perform a coding process of generating the coded bit stream BS which is coded in conformity to the H.265/HEVC standard using the largest coding unit (LCU) having a size smaller than the maximum size of 64×64 pixels, for example, a size of 32×32 pixels as a process unit.

Further, in the moving-picture decoding processing apparatus or the moving-picture coding processing apparatus, the pixel size of each frame is not limited only to 1,920 pixels×1,080 pixels as the pixel size of high definition (HD). Specifically, the pixel size of each frame in the moving-picture decoding processing apparatus or the moving-picture coding processing apparatus can be set to 4,096 pixels×2,160 pixels as the pixel size of the 4K TV or 3,840 pixels×2,160 pixels. In the case where the pixel size of a frame is that of the 4K TV as described above, the moving-picture coding process is executed so that the maximum value of a motion vector becomes almost the half of the pixel size of the 4K TV.

What is claimed is:

1. A moving-picture decoding processing apparatus comprising:
   a decoding control unit that generates coded information of a first plurality of frames and coded information of a second plurality of frames from a coded bit stream;
   a first decoding processing unit that receives the coded information of the first plurality of frames supplied from the decoding control unit; and
   a second decoding processing unit that receives the coded information of the second plurality of frames supplied from the decoding control unit,
   wherein in a first period, the coded information from a start point to an intermediate point of a first preceding frame included in the first plurality of frames is subjected to a decoding process by the first decoding processing unit in response to a first start signal from the decoding control unit for a monitoring of the decoding process position of the first decoding processing unit by the second decoding processing unit,
   wherein in response to reach of the intermediate point of the decoding process of the first preceding frame by the first decoding processing unit in the first period, the first decoding processing unit generates and transmits a first control signal to the decoding control unit;
   wherein, in a second period, the coded information from a start point to an intermediate point of a second preceding frame included in the second plurality of frames is subjected to a decoding process by the second decoding processing unit in response to a second start signal from the decoding control unit, the second start signal generated based on the first control signal,
   wherein in the second period, the coded information from the intermediate point to an end point of the first preceding frame included in the first plurality of frames is subjected to a decoding process by the first decoding processing unit,
   wherein in response to reach of the end point of the decoding process of the first preceding frame by the first decoding processing unit in the second period, the first decoding processing unit generates and transmits a first end signal indicative of the reach of the end point of the decoding process to the decoding control unit,
   wherein, in a third period, the coded information from the intermediate point to an end point of the second preceding frame is subjected to a decoding process by the second decoding processing unit,
   wherein, the second decoding processing unit receives a second control signal from the decoding control unit to stop the monitoring of the decoding process position of the first decoding processing unit by the second decoding processing unit in the third period, and in response, inhibits the use of a result of the decoding process by the first decoding processing unit in the third period for a process of decoding the coded information from the intermediate point to the end point of the second preceding frame by the second decoding processing unit in the third period and permits use of a result of the decoding process of the first preceding frame by the first decoding processing unit in the second period for a process of decoding the coded information of the second preceding frame by the second decoding processing unit in the third period, the second control signal generated based on the first end signal,
   wherein in response to reach of the intermediate point of the process of decoding the second preceding frame by the second decoding processing unit in the second period, the second decoding processing unit generates and transmits a third control signal to the decoding control unit, and
   wherein coded information from the start point to an intermediate point of a first subsequent frame included in the first plurality of frames is subjected to a decoding process by the first decoding processing unit in the third period in response to a third start signal from the decoding control unit, the third start signal generated based on the third control signal.

2. A moving-picture decoding processing apparatus according to claim 1,
   wherein in response to a second end signal indicative of reach of the end point of the process of decoding the second preceding frame by the second decoding processing unit in the third period, in a fourth period, the coded information from the intermediate point to the end point of the first subsequent frame is subjected to a decoding process by the first decoding processing unit,
   wherein, for a process of decoding the coded information from the intermediate point to the end point of the first subsequent frame by the first decoding processing unit in the fourth period, in response to the second end signal, use of a result of the decoding process by the second decoding processing unit in the fourth period is inhibited,
   wherein, for a process of decoding the coded information of the first subsequent frame by the first decoding processing unit in the fourth period, use of a result of the decoding process of the second preceding frame by the second decoding processing unit in the third period is permitted, and
   wherein in response to reach of the intermediate point of the process of decoding the first subsequent frame by the first decoding processing unit in the third period, coded information from the start point to an intermediate point of a second subsequent frame included in the second plurality of frames is subjected to a decoding process by the second decoding processing unit in the fourth period.

3. The moving-picture decoding processing apparatus according to claim 2,
   wherein each of the first and second decoding processing units includes a variable-length decoding unit, an inverse quantizing unit, an inverse transforming unit, a selector unit, a motion compensating unit, an intra-predicting unit, an adding unit, and a filter unit.

4. The moving-picture decoding processing apparatus according to claim 3,
wherein the decoding control unit, the first decoding processing unit, and the second decoding processing unit are integrated in a semiconductor chip of a semiconductor integrated circuit.

5. The moving-picture decoding processing apparatus according to claim 3,
wherein the coded bit stream conformed to the H.264/AVC standard or H.265/HEVC standard is decoded.

6. A moving-picture coding processing apparatus comprising:
a coding control unit that receives video input signals to be coded including moving-picture signals of a first plurality of frames and moving-picture signals of a second plurality of frames;
a first coding processing unit that receives the moving-picture signals of the first plurality of frames from the coding control unit; and
a second coding processing unit that receives the moving-picture signals of the second plurality of frames from the coding control unit,
wherein in a first period, the moving-picture signals from a start point to an intermediate point of a first preceding frame included in the first plurality of frames are subjected to a coding process by the first coding processing unit in response to a first start signal from the coding control unit,
wherein in response to reach of the intermediate point of the coding process of the first preceding frame by the first coding processing unit in the first period, the first coding processing unit generates and transmits a first control signal to the coding control unit for a monitoring of the coding process position of the first coding processing unit by the second coding processing unit,
wherein in a second period, the moving-picture signals from a start point to an intermediate point of a second preceding frame included in the second plurality of frames are subjected to a coding process by the second coding processing unit in response to a second start signal from the coding control unit, the second start signal generated based on the first control signal,
wherein in the second period, the moving-picture signals from the intermediate point to an end point of the first preceding frame included in the first plurality of frames are subjected to a coding process by the first coding processing unit,
wherein in response to reach of the end point of the coding process of the first preceding frame by the first coding processing unit in the second period, the first coding processing unit generates and transmits a first end signal indicative of the reach of the end point of the coding process to the coding control unit;
wherein in a third period, the moving-picture signals from the intermediate point to an end point of the second preceding frame is subjected to a coding process by the second coding processing unit,
wherein, the second coding processing unit receives a second control signal from the coding control unit to stop the monitoring of the coding process position of the first coding processing unit by the second coding processing unit in the third period, and in response, inhibits the use of a result of the coding process by the first coding processing unit in the third period for a process of coding the moving-picture signals from the intermediate point to the end point of the second preceding frame by the second coding processing unit in the third period and permits use of a result of the coding process of the first preceding frame by the first coding processing unit in the second period for a process of coding the moving-picture signals of the second preceding frame by the second coding processing unit in the third period, the second control signal generated based on the first end signal,
wherein in response to reach of the intermediate point of the process of coding the second preceding frame by the second coding processing unit in the second period, the second coding processing unit generates and transmits a third control signal to the coding control unit, and
wherein the moving-picture signals from the start point to an intermediate point of a first subsequent frame included in the first plurality of frames is subjected to a coding process by the first coding processing unit in the third period in response to a third start signal from the coding control unit, the third start signal generated based on the third control signal.

7. The moving-picture coding processing apparatus according to claim 6,
wherein in response to a second end signal indicative of reach of the end point of the process of coding the second preceding frame by the second coding processing unit in the third period, in a fourth period, the moving-picture signals from the intermediate point to the end point of the first subsequent frame are subjected to a coding process by the first coding processing unit,
wherein, for a process of coding the moving-picture signals from the intermediate point to the end point of the first subsequent frame by the first coding processing unit in the fourth period, in response to the second end signal, use of a result of the coding process by the second coding processing unit in the fourth period is inhibited,
wherein, for a process of coding the moving-picture signals of the first subsequent frame by the first coding processing unit in the fourth period, use of a result of the coding process of the second preceding frame by the second coding processing unit in the third period is permitted, and
wherein in response to reach of the intermediate point of the process of coding the first subsequent frame by the first coding processing unit in the third period, the moving-picture signals from the start point to an intermediate point of a second subsequent frame included in the second plurality of frames are subjected to a coding process by the second coding processing unit in the fourth period.

8. The moving-picture coding processing apparatus according to claim 7,
wherein each of the first and second coding processing units includes a subtracter, a frequency transforming unit, a quantizing unit, an inverse quantizing unit, an inverse frequency transforming unit, an adder, a filter unit, a motion vector detecting unit, a motion compensating unit, an intra-predicting unit, a selector unit, and a variable-length coding unit.

9. The moving-picture coding processing apparatus according to claim 8, wherein the coding control unit, the first coding processing unit, and the second coding processing unit are integrated in a semiconductor chip of a semiconductor integrated circuit.

10. The moving-picture coding processing apparatus according to claim 8, wherein the moving-picture coding processing apparatus generates a coded bit stream conformed to the H.264/AVC standard or H.265/HEVC standard by coding video input signals.

11. An operating method of a moving-picture decoding processing apparatus comprising a decoding control unit, a first decoding processing unit, and a second decoding processing unit, wherein the decoding control unit generates coded information of a first plurality of frames and coded information of a second plurality of frames from a coded bit stream, wherein the coded information of the first plurality of frames is supplied from the decoding control unit to the first decoding processing unit, the coded information of the second plurality of frames is supplied from the decoding control unit to the second decoding processing unit, wherein in a first period, the coded information from a start point to an intermediate point of a first preceding frame included in the first plurality of frames is subjected to a decoding process by the first decoding processing unit in response to a first start signal from the decoding control unit, wherein in response to reach of the intermediate point of the decoding process of the first preceding frame by the first decoding processing unit in the first period, the first decoding processing unit generates and transmits a first control signal to the decoding control unit for a monitoring of the decoding process position of the first decoding processing unit by the second decoding processing unit;

wherein, in a second period, the coded information from a start point to an intermediate point of a second preceding frame included in the second plurality of frames is subjected to a decoding process by the second decoding processing unit in response to a second start signal from the decoding control unit, the second start signal generated based on the first control signal, wherein in the second period, the coded information from the intermediate point to an end point of the first preceding frame included in the first plurality of frames is subjected to a decoding process by the first decoding processing unit, wherein in response to reach of the end point of the decoding process of the first preceding frame by the first decoding processing unit in the second period, the first decoding processing unit generates and transmits a first end signal indicative of the reach of the end point of the decoding process to the decoding control unit, wherein, in a third period, the coded information from the intermediate point to an end point of the second preceding frame is subjected to a decoding process by the second decoding processing unit, wherein, the second decoding processing unit receives a second control signal from the decoding control unit to stop the monitoring of the decoding process position of the fist decoding processing unit by the second decoding processing unit in the third period, and in response, inhibits the use of a result of the decoding process by the first decoding processing unit in the third period for a process of decoding the coded information from the intermediate point to the end point of the second preceding frame by the second decoding processing unit in the third period permits use of a result of the decoding process of the first preceding frame by the first decoding processing unit in the second period for a process of decoding the coded information of the second preceding frame by the second decoding processing unit in the third period, the second control signal generated based on the first end signal, wherein in response to reach of the intermediate point of the process of decoding the second preceding frame by the second decoding processing unit in the second period, the second decoding processing unit generates and transmits a third control signal to the decoding control unit, and wherein coded information from the start point to an intermediate point of a first subsequent frame included in the first plurality of frames is subjected to a decoding process by the first decoding processing unit in the third period in response to a third start signal from the decoding control unit, the third start signal generated based on the third control signal.

12. The operating method of a moving-picture decoding processing apparatus according to claim 11, wherein in response to a second end signal indicative of reach of the end point of the process of decoding the second preceding frame by the second decoding processing unit in the third period, in a fourth period, the coded information from the intermediate point to the end point of the first subsequent frame is subjected to a decoding process by the first decoding processing unit, wherein, for a process of decoding the coded information from the intermediate point to the end point of the first subsequent frame by the first decoding processing unit in the fourth period, in response to the second end signal, use of a result of the decoding process by the second decoding processing unit in the fourth period is inhibited, wherein, for a process of decoding the coded information of the first subsequent frame by the first decoding processing unit in the fourth period, use of a result of the decoding process of the second preceding frame by the second decoding processing unit in the third period is permitted, and wherein in response to reach of the intermediate point of the process of decoding the first subsequent frame by the first decoding processing unit in the third period, coded information from the start point to an intermediate point of a second subsequent frame included in the second plurality of frames is subjected to a decoding process by the second decoding processing unit in the fourth period.

13. The operating method of a moving-picture decoding processing apparatus according to claim 12, wherein each of the first and second decoding processing units includes a variable-length decoding unit, an inverse quantizing unit, an inverse transforming unit, a selector unit, a motion compensating unit, an intra-predicting unit, an adding unit, and a filter unit.

14. The operating method of a moving-picture decoding processing apparatus according to claim 13, wherein the decoding control unit, the first decoding processing unit, and the second decoding processing unit are integrated in a semiconductor chip of a semiconductor integrated circuit.

15. The operating method of a moving-picture decoding processing apparatus according to claim 13,
wherein the moving-picture decoding processing apparatus decodes the coded bit stream conformed to the H.264/AVC standard or H.265/HEVC standard.

16. An operating method of a moving-picture coding processing apparatus comprising a coding control unit, a first coding processing unit, and a second coding processing unit,
wherein video input signals to be coded including moving-picture signals of a first plurality of frames and moving-picture signals of a second plurality of frames are supplied to the coding control unit,
wherein the moving-picture signals of the first plurality of frames are supplied from the coding control unit to the first coding processing unit, the moving-picture signals of the second plurality of frames are supplied from the coding control unit to the second coding processing unit,
wherein in a first period, the moving-picture signals from a start point to an intermediate point of a first preceding frame included in the first plurality of frames are subjected to a coding process by the first coding processing unit in response to a first start signal from the coding control unit,
wherein in response to reach of the intermediate point of the coding process of the first preceding frame by the first coding processing unit in the first period, the first coding processing unit generates and transmits a first control signal to the coding control unit for a monitoring of the coding process position of the first coding processing unit by the second coding processing unit,
wherein in a second period, the moving-picture signals from a start point to an intermediate point of a second preceding frame included in the second plurality of frames are subjected to a coding process by the second coding processing unit in response to a second start signal from the coding control unit, the second start signal generated based on the first control signal,
wherein in the second period, the moving-picture signals from the intermediate point to an end point of the first preceding frame included in the first plurality of frames are subjected to a coding process by the first coding processing unit,
wherein in response to reach of the end point of the coding process of the first preceding frame by the first coding processing unit in the second period, the first coding processing unit generates and transmits a first end signal indicative of the reach of the end point of the coding process to the coding control unit;
wherein in a third period, the moving-picture signals from the intermediate point to an end point of the second preceding frame is subjected to a coding process by the second coding processing unit,
wherein, the second coding processing unit receives a second control signal from the coding control unit to stop the monitoring of the coding process position of the first coding processing unit by the second coding processing unit in the third period, and in response, inhibits the use of a result of the coding process by the first coding processing unit in the third period for a process of coding the moving-picture signals from the intermediate point to the end point of the second preceding frame by the second coding processing unit in the third period and permits use of a result of the coding process of the first preceding frame by the first coding processing unit in the second period for a process of coding the moving-picture signals of the second preceding frame by the second coding processing unit in the third period, the second control signal generated based on the first end signal,
wherein in response to reach of the intermediate point of the process of coding the second preceding frame by the second coding processing unit in the second period, the second coding processing unit generates and transmits a third control signal to the coding control unit, and
wherein the moving-picture signals from the start point to an intermediate point of a first subsequent frame included in the first plurality of frames is subjected to a coding process by the first coding processing unit in the third period in response to a third start signal from the coding control unit, the third start signal generated based on the third control signal.

17. The operating method of a moving-picture coding processing apparatus according to claim 16,
wherein in response to a second end signal indicative of reach of the end point of the process of coding the second preceding frame by the second coding processing unit in the third period, in a fourth period, the moving-picture signals from the intermediate point to the end point of the first subsequent frame are subjected to a coding process by the first coding processing unit,
wherein, for a process of coding the moving-picture signals from the intermediate point to the end point of the first subsequent frame by the first coding processing unit in the fourth period, in response to the second end signal, use of a result of the coding process by the second coding processing unit in the fourth period is inhibited,
wherein, for a process of coding the moving-picture signals of the first subsequent frame by the first coding processing unit in the fourth period, use of a result of the coding process of the second preceding frame by the second coding processing unit in the third period is permitted, and
wherein in response to reach of the intermediate point of the process of coding the first subsequent frame by the first coding processing unit in the third period, the moving-picture signals from the start point to an intermediate point of a second subsequent frame included in the second plurality of frames are subjected to a coding process by the second coding processing unit in the fourth period.

18. The operating method of a moving-picture coding processing apparatus according to claim 17,
wherein each of the first and second coding processing units includes a subtracter, a frequency transforming unit, a quantizing unit, an inverse quantizing unit, an inverse frequency transforming unit, an adder, a filter unit, a motion vector detecting unit, a motion compensating unit, an intra-predicting unit, a selector unit, and a variable-length coding unit.

19. The operating method of a moving-picture coding processing apparatus according to claim 18,
wherein the coding control unit, the first coding processing unit, and the second coding processing unit are integrated in a semiconductor chip of a semiconductor integrated circuit.

20. The operating method of a moving-picture coding processing apparatus according to claim 18, wherein the moving-picture coding processing apparatus generates coded bit stream conformed to the H.264/AVC standard or H.265/HEVC standard by coding video input signals.

* * * * *